US012008953B2

(12) United States Patent
Song et al.

(10) Patent No.: US 12,008,953 B2
(45) Date of Patent: Jun. 11, 2024

(54) DISPLAY DEVICE

(71) Applicant: SAMSUNG DISPLAY CO., LTD., Yongin-si (KR)

(72) Inventors: Hyun Kyung Song, Yongin-si (KR); Jong Woong Park, Yongin-si (KR); Hye Sang Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/323,978

(22) Filed: May 25, 2023

(65) Prior Publication Data

US 2024/0071293 A1 Feb. 29, 2024

(30) Foreign Application Priority Data

Aug. 26, 2022 (KR) ........................ 10-2022-0107946

(51) Int. Cl.
*G09G 3/32* (2016.01)

(52) U.S. Cl.
CPC ....... *G09G 3/32* (2013.01); *G09G 2300/0452* (2013.01); *G09G 2320/0242* (2013.01); *G09G 2330/021* (2013.01); *G09G 2340/0457* (2013.01)

(58) Field of Classification Search
CPC ............. G09G 3/32; G09G 2320/0242; G09G 2300/0452; G09G 2330/021; G09G 2340/0457
See application file for complete search history.

(56) References Cited

U.S. PATENT DOCUMENTS

| | | | | | |
|---|---|---|---|---|---|
| 7,492,379 | B2 | 2/2009 | Credelle et al. | | |
| 10,147,351 | B2 | 12/2018 | Yang et al. | | |
| 2007/0075951 | A1* | 4/2007 | Lin | G09G 3/3648 | 345/89 |
| 2012/0086741 | A1* | 4/2012 | Yokonuma | G09G 3/3406 | 345/82 |
| 2022/0215798 | A1* | 7/2022 | Pyun | G09G 3/2096 | |

FOREIGN PATENT DOCUMENTS

| | | |
|---|---|---|
| KR | 10-2019-0126664 | 11/2019 |
| KR | 10-2211994 | 2/2021 |
| KR | 10-2021-0101053 | 8/2021 |

* cited by examiner

*Primary Examiner* — Muhammad N Edun
(74) *Attorney, Agent, or Firm* — F. Chau & Associates, LLC

(57) ABSTRACT

A display device includes a display panel. The display panel includes sub-pixels. A driver converts first frame data corresponding to a first pixel arrangement of the sub-pixels into second frame data corresponding to a second pixel arrangement and provides data signals corresponding to second frame data to the sub-pixels having the second pixel arrangement. The driver includes a padding circuit and a rendering circuit. The padding circuit converts the first frame data into padding data by adding a padding value to at least one of a front end and a rear end of each line data of the first frame data. The rendering circuit generates the second frame data by applying a rendering filter to the padding data.

20 Claims, 25 Drawing Sheets

DISPLAY DEVICE

CROSS-REFERENCE TO RELATED APPLICATION

This non-provisional patent application claims priority under 35 U.S.C. § 119 to Korean Patent Application No. 10-2022-0107946, filed on, Aug. 26, 2022, the disclosure of which is incorporated by reference in its entirety herein.

1. TECHNICAL FIELD

The disclosure relates to a display device.

2. DISCUSSION OF RELATED ART

A display device includes a plurality of pixels expressing a full-color, and each of the pixels includes sub-pixels emitting light with different monochromatic colors. However, an unwanted line of a specific color may be visually recognized in an image displayed on the display device according to how the sub-pixels are two-dimensionally arranged, thereby reducing image quality of the display device. For example, when first color sub-pixels emitting light of a first color are disposed at the outermost edge of a display panel, a line of the first color may be visually recognized along the outermost edge of the display panel.

Thus, there is a need for a display device where this unwanted line is not perceivable by a user.

SUMMARY

At least one object of the disclosure is to provide a display device capable of improving display quality by preventing an unwanted line of a specific color from being visually recognized.

According to an embodiment of the disclosure, a display device includes a display panel including pixels and each pixel including sub-pixels, and a driver configured to convert first frame data corresponding to a first pixel arrangement of the sub-pixels into second frame data corresponding to a second pixel arrangement, and provide data signals corresponding to the second frame data to the sub-pixels having the second pixel arrangement. The driver includes a padding circuit configured to convert the first frame data into padding data by adding a first padding value to at least one of a front end and a rear end of each line data of the first frame data, and a rendering circuit configured to generate the second frame data by applying a rendering filter to the padding data.

The number of the sub-pixels of a first one of the pixels having the second pixel arrangement may be different from the number of the sub-pixels of a second one of the pixels having the first pixel arrangement.

The padding circuit may add a first padding value to the front end of the line data, and the rendering circuit may apply the rendering filter of one-dimensional to a previous data value and a current data value in the line data.

The first padding value may be 0 or may correspond to a grayscale of 0.

The padding circuit may calculate the first padding value by multiplying a first data value of the line data by an offset value.

The padding circuit may add a second padding value to the rear end of the line data, and the rendering circuit may apply the rendering filter of one-dimension to a current data value and a subsequent data value in the line data.

The sub-pixels may include a first color sub-pixel, a second color sub-pixel, and a third color sub-pixel, the first frame data may include first color data for the first color sub-pixel, second color data for the second color sub-pixel, and third color data for the third color sub-pixel, the padding circuit may add the padding value to each of the first color data and the third color data, and the rendering circuit may apply a first rendering filter to each of the first color data and the third color data.

The padding circuit and the rendering circuit may bypass the second color data.

The driver may further include a dimming circuit configured to dim values corresponding to an edge of the display panel among values of the second color data.

The padding circuit may add padding line data to at least one of a front end and a rear end of the first frame data.

The padding circuit may add first padding line data to the front end of the first frame data, and the rendering circuit may apply the rendering filter to a current data value in the line data and a data value in previous line data adjacent to the current data value.

The padding circuit may calculate the padding line data by applying a first offset value to at least one of first line data and last line data in the first frame data, and calculate second padding value for another line data by applying a second offset value to the other line data in the first frame data, and the second offset value may be different from the first offset value.

The sub-pixels may include a first color sub-pixel, a second color sub-pixel, and a third color sub-pixel, the first frame data may include first color data for the first color sub-pixel, second color data for the second color sub-pixel, and third color data for the third color sub-pixel, the padding circuit may add first padding line data to a front end of each of the first color data and the third color data, and the rendering circuit may apply a rendering filter to each of the first color data and the third color data.

The padding circuit may add second padding line data to a rear end of the second color data, and the rendering circuit may apply the rendering filter to the second color data.

When the first frame data is a full-white image, a luminance of outermost sub-pixels which are most adjacent to an edge of the display panel may be different from a luminance of remaining sub-pixels except for the outermost sub-pixels among the sub-pixels.

According to an embodiment of the disclosure, a display device includes a display panel including sub-pixels, and a driver configured to convert first frame data corresponding to a first pixel arrangement of the sub-pixels into second frame data corresponding to a second pixel arrangement, and provide data signals corresponding to the second frame data to the sub-pixels having the second pixel arrangement. The driver includes a padding circuit configured to convert the first frame data into padding data by padding line data on at least one of a front end and a rear end of the first frame data, and a rendering circuit configured to generate the second frame data by applying a rendering filter to the padding data.

The padding circuit may add first padding line data to the front end of the first frame data, and the rendering circuit may apply the rendering filter to a current data value in the line data and a data value in previous line data adjacent to the current data value.

The padding circuit may calculate a first value of the line data to be padded by applying a first offset value to at least one of first line data and last line data in the first frame data, and calculate at least one remaining value except for the first value of the line data to be padded by applying a second offset value to the at least one of the first line data and the last line data in the first frame data, and the second offset value may be different from the first offset value.

The sub-pixels may include a first color sub-pixel, a second color sub-pixel, and a third color sub-pixel, the first frame data may include first color data for the first color sub-pixel, second color data for the second color sub-pixel, and third color data for the third color sub-pixel, the padding circuit may add first padding line data to a front end of each of the first color data and the third color data, and the rendering circuit may apply the rendering filter to each of the first color data and the third color data.

The padding circuit may add second padding line data to a rear end of the second color data, and the rendering circuit may apply the rendering filter to the second color data.

A display device according to at least one embodiment of the disclosure may perform a dimming process on a data value of the sub-pixels positioned at the outermost edge of the display panel by padding input image data before sub-pixel rendering for the input image data. Therefore, an unwanted line of a specific color is prevented from being visually recognized at the outermost edge of the display panel, and display quality may be improved.

In addition, when the display device performs only a padding operation of adding a data value (for example, a value of 0) without a calculation operation for dimming, an algorithm for processing the input image data may be simplified and an unnecessary power consumption increase related to the calculation operation may be prevented.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENTS

Figure 1:
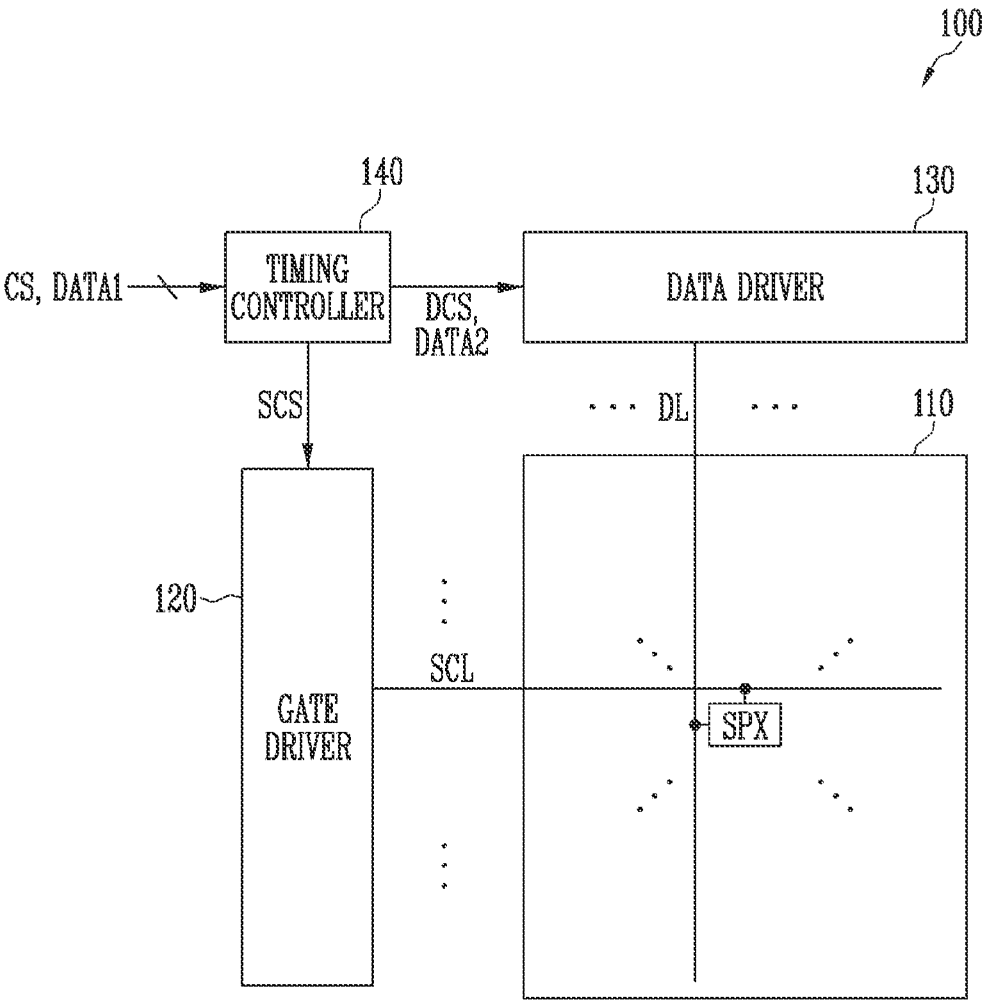
FIG. 1 is a block diagram illustrating a display device according to an embodiment of the disclosure.

The disclosure may be modified in various ways and may have various forms, and specific embodiments will be illustrated in the drawings and described in detail herein. In the following description, the singular forms also include the plural forms unless the context clearly includes the singular.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the inventive concept. In addition, in some embodiments, the block, unit and/or module may be physically combined into more complex blocks, units, and/or modules without departing from the scope of the inventive concept.

Meanwhile, the disclosure is not limited to the embodiments disclosed below, and may be modified in various forms and may be implemented. In addition, each of the embodiments disclosed below may be implemented alone or in combination with at least one of other embodiments.

In the drawings, some components which are not directly related to a characteristic of the disclosure may be omitted to clearly represent the disclosure. In addition, some components in the drawings may be shown with a slightly exaggerated, size, ratio, or the like. Throughout the drawings, the same or similar components will be given by the same reference numerals and symbols as much as possible even though they are shown in different drawings, and repetitive descriptions will be omitted.

FIG. 1 is a block diagram illustrating a display device according to an embodiment of the disclosure.

The display device 100 may include a display unit 110 (or a display panel), a gate driver 120 (or a scan driver or driver circuit), a data driver 130 (or a source driver or driver circuit), and a timing controller 140 (or a data processor or control circuit).

The display unit 110 may display an image. The display unit 110 may include a scan line SCL (or a gate line), a data line DL, and a sub-pixel SPX. Each of the scan line SCL, the data line DL, and the sub-pixel SPX may be provided in plurality. As will be described later, a plurality of sub-pixels SPX emitting light with different monochromatic colors may configure a pixel, which is a minimum unit for displaying a full-color image. For example, a single pixel may be represented by a plurality of sub-pixels SPX.

The sub-pixel SPX may be disposed or positioned in an area (for example, a pixel area) partitioned by the scan line SCL and the data line DL. The sub-pixel SPX may be connected to the scan line SCL and the data line DL.

The sub-pixel SPX may store or write a data signal (or data voltage) provided through the data line DL in response to a scan signal (or a gate signal) provided through the scan line SCL, and may emit light with a luminance corresponding to the stored data.

The sub-pixel SPX may include at least one transistor operating in response to the scan signal, a driving transistor controlling a driving current in response to the data signal, and a light emitting element emitting light with a luminance corresponding to the driving current. The light emitting element may be configured of an organic light emitting diode, an inorganic light emitting diode, a quantum dot/well light emitting diode, and the like. A plurality of light emitting elements may be provided in the sub-pixel SPX. At this time, the plurality of light emitting elements may be connected in series, parallel, series-parallel, or the like. Alternatively, the display unit 110 may be implemented as a non-emission type display panel, such as a liquid crystal display panel, instead of a self-emission type display panel. When the display unit 110 is implemented as a non-emission type, the display device 100 may additionally include a light source such as a backlight unit.

The gate driver 120 may generate the scan signal based on a scan control signal SCS (or a gate control signal), and provide the scan signal to the scan line SCL. Here, the scan control signal SCS may include a start signal, clock signals, and the like, and may be provided from the timing controller 140 to the gate driver 120. For example, the gate driver 120 may be implemented as a shift register that generates and outputs the scan signal by sequentially shifting a pulse shape of start signal using the clock signals.

The gate driver 120 may be formed on the display 110 together with the sub-pixel SPX. However, the gate driver 120 is not limited thereto. For example, the gate driver 120 may be implemented as an integrated circuit, mounted on a circuit film, and connected to the timing controller 140 via at least one circuit film and printed circuit board.

The data driver 130 may generate the data signal (or the data voltage) based on image data DATA2 and a data control signal DCS provided from the timing controller 140, and provide the data signal to the display unit 110 (or the sub-pixel SPX) through the data line DL. Here, the data control signal DCS may be a signal that controls an operation of the data driver 130, and may include a load signal (or a data enable signal) indicating an output of a valid data signal, a horizontal start signal, a data clock signal, and the like. For example, the data driver 130 may include a shift register generating a sampling signal by shifting the horizontal start signal in synchronization with a data clock signal, a latch latching the image data DATA2 in response to the sampling signal, a digital-to-analog converter (or a decoder) converting latched image data (for example, digital data) into an analog data signal, and a buffer (or an amplifier) outputting the data signal to the data line DL.

The timing controller 140 may receive input image data DATA1 and a control signal CS from an external device (for example, a graphic processor), and generate the scan control signal SCS and the data control signal DCS based on the control signal CS. The control signal CS may include a vertical synchronization signal, a horizontal synchronization signal, a reference clock signal, and the like. The vertical synchronization signal may indicate a start of frame data (that is, data corresponding to a frame period in which one frame image is displayed), and the horizontal synchronization signal may indicate a start of a data row (that is, one data row among a plurality of data rows included in frame data).

In addition, the timing controller 140 may convert the input image data DATA1 (or first frame data) to generate the image data DATA2 (or second frame data). For example, the timing controller 140 may convert the input image data DATA1 of an RGB format into the image data DATA2 having a format corresponding to a pixel arrangement (for example, PENTILE™) in the display unit 110. For example, the timing controller 140 may convert the input image data DATA1 into the image data DATA2 using a sub-pixel rendering technique.

In an embodiment, the timing controller 140 converts the input image data DATA1 into padding data by performing a padding process on the input image data DATA1, and generates the second image data DATA2 by applying a sub-pixel rendering technique to the padding data. For example, the timing controller 140 may add a padding value (or a dummy value, for example, a value of 0) to the input image data DATA1 corresponding to at least one edge (or the outermost edge) of the display unit 110. In this case, a data value (a grayscale value, or a grayscale) in the image data DATA2 for the sub-pixel SPX positioned at at least one edge of the display unit 110 may be generated based on initial data value (that is, a data value in the input image data DATA1) and the padding value. A luminance of the sub-pixel SPX positioned at at least one edge of the display unit 110 may be changed according to the padding value. Therefore, an unwanted line of a specific color along at least one edge of the display unit 110 may be prevented from being visually recognized by use of the padding process. The padding process and the padding data generated thereby are described later with reference to FIGS. 9 and 14.

Meanwhile, the data driver 130 and the timing controller 140 may be implemented as separate integrated circuits, but are not limited thereto. For example, the data driver 130 and the timing controller 140 may be implemented as one integrated circuit (or one driver). According to an embodiment, at least two of the gate driver 120, the data driver 130, and the timing controller 140 may be implemented as one integrated circuit (or driver).

Figure 2:
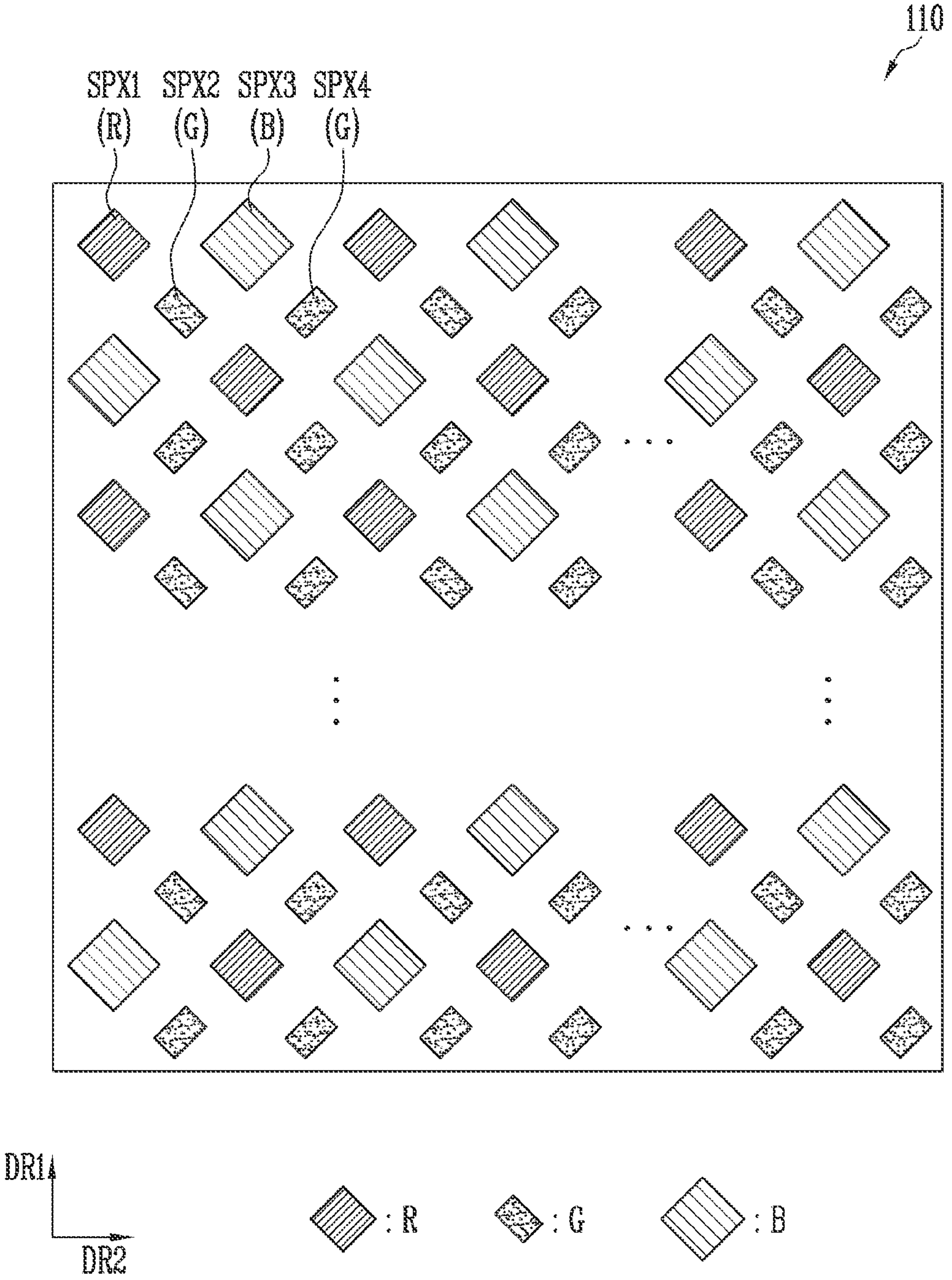
FIG. 2 is a diagram illustrating an example of a display unit included in the display device of FIG. 1.

FIG. 2 is a diagram illustrating an example of the display unit included in the display device of FIG. 1. In FIG. 2, the display unit 110 is schematically shown based on an arrangement (or an arrangement structure) of sub-pixels SPX1 to SPX4.

Referring to FIGS. 1 and 2, the display unit 110 may include the sub-pixels SPX1 to SPX4 that are repeatedly arranged along a first direction DR1 and a second direction DR2.

At least some of the sub-pixels SPX1 to SPX4 may emit light in different colors. For example, the first sub-pixel SPX1 may emit light in a first color, the second sub-pixel SPX2 may emit light in a second color, the third sub-pixel SPX3 may emit light in a third color, and the four sub-pixels SPX4 may emit light in the second color. Hereinafter, for convenience of description, it is assumed that the first sub-pixel SPX1 is a red sub-pixel R emitting light in red, the second sub-pixel SPX2 is a green sub-pixel G emitting light in green, the third sub-pixel SPX3 is a blue sub-pixel B emitting light in blue, and the fourth sub-pixel SPX4 is a green sub-pixel G emitting light in green.

Based on the red sub-pixel R of a first row and a first column, the blue sub-pixel B and the red sub-pixel R may be repeatedly arranged along the first direction DR1 and the second direction DR2, and the green sub-pixel G may be positioned in a diagonal direction with respect to the red sub-pixel R and/or the blue sub-pixel B. That is, the display unit 110 may have an RGBG pixel arrangement or a diamond PENTILE™ pixel arrangement.

Figure 3:
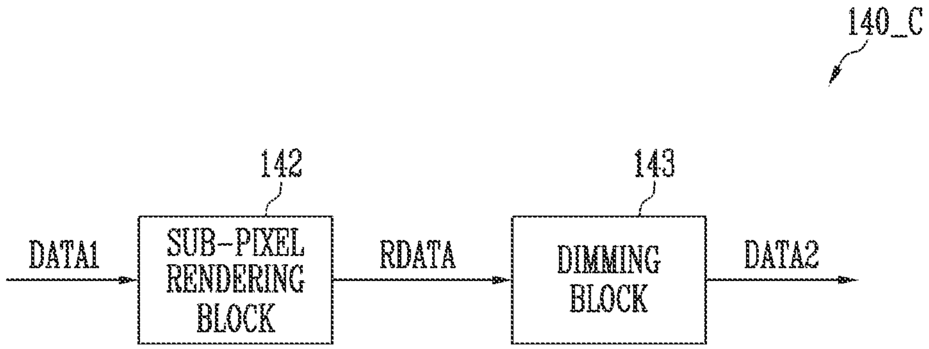
FIG. 3 is a diagram illustrating a comparative embodiment of a timing controller included in the display device of FIG. 1.

FIG. 3 is a diagram illustrating a comparative embodiment of the timing controller included in the display device of FIG. 1. In FIG. 3, the timing controller 140_C according to the comparative embodiment is briefly shown based on a function of converting the input image data DATA1 into the image data DATA2.

Referring to FIGS. 1 to 3, the timing controller 140_C may include a sub-pixel rendering block 142 (a rendering block, or a sub-pixel rendering circuit) and a dimming block 143 (or a dimming circuit). Each of the sub-pixel rendering block 142 and the dimming block 143 may be implemented as hardware by including a logic circuit, a memory device, and the like, or may be implemented as software that performs some functions in a processor (or an integrated circuit).

The sub-pixel rendering block 142 may generate rendering data RDATA from the input image data DATA1 using a sub-pixel rendering technique (or algorithm). Various types of known sub-pixel rendering algorithms associated with an RGBG pixel arrangement of FIG. 2 may be applied to the sub-pixel rendering block 142. For example, the sub-pixel rendering block 142 may generate the RGBW format of rendering data RDATA by applying a rendering filter (or a sub-pixel rendering filter) to the RGB format of input image data DATA1. The rendering filter is described later with reference to FIGS. 5 and 7.

The dimming block 143 may change (or process dimming) a data value in the rendering data RDATA for the sub-pixels SPX1 to SPX3 positioned at the outermost edge of the display unit 110 to generate the image data DATA2.

Figure 4:
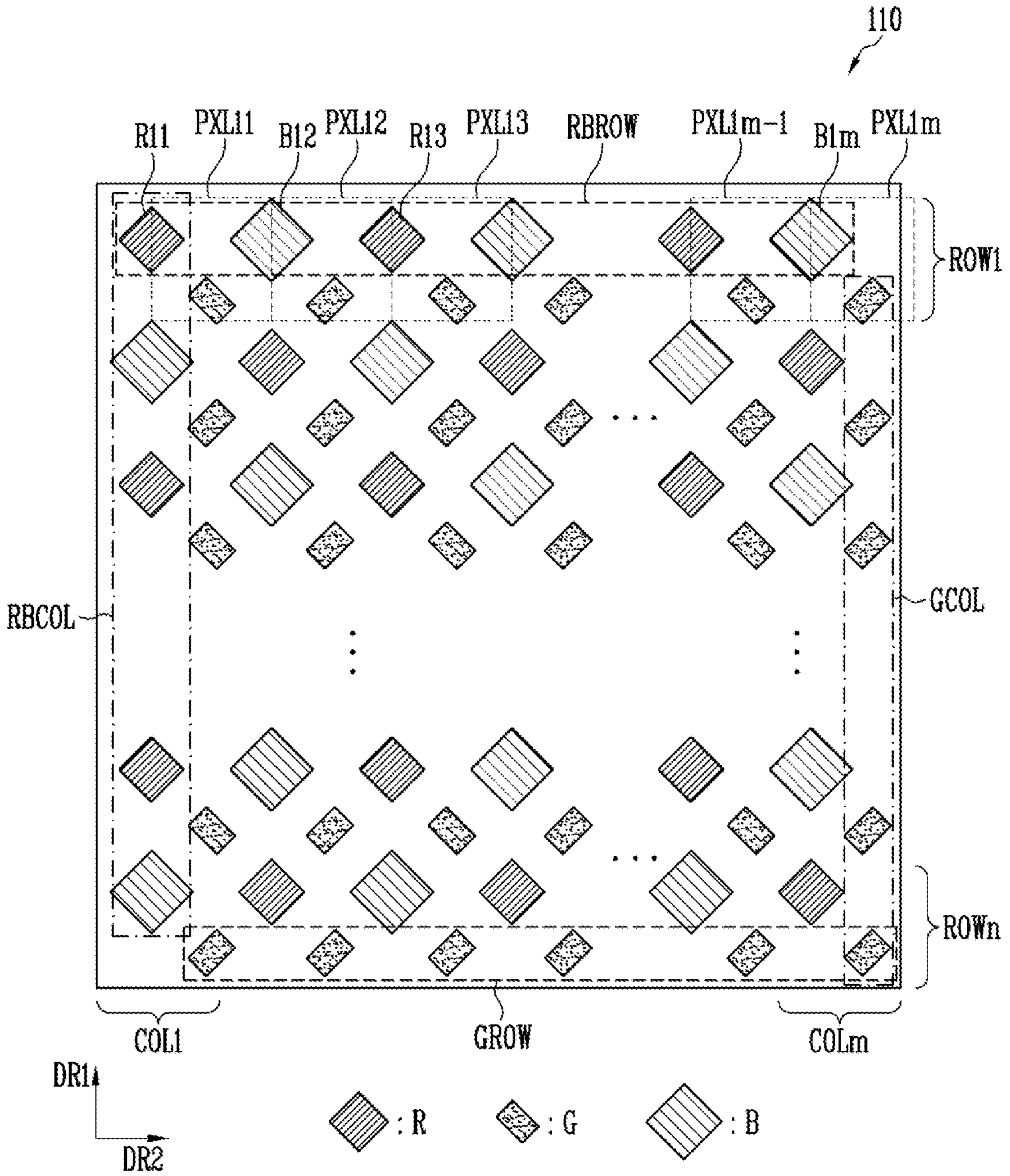
FIG. 4 is a diagram illustrating an embodiment of the display unit of FIG. 2.
Figure 5:
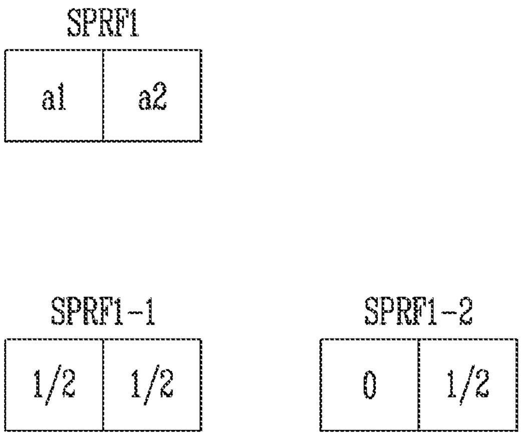
FIG. 5 is a diagram illustrating an example of a rendering filter used in a sub-pixel rendering block of FIG. 3.

FIG. 4 is a diagram illustrating an embodiment of the display unit of FIG. 2. In FIG. 4, pixels PXL11 to PXL1*m* are further shown in relation to sub-pixel rendering. FIG. 5 is a diagram illustrating an example of the rendering filter used in the sub-pixel rendering block of FIG. 3.

Referring to FIGS. 1 to 4, one red sub-pixel R, two green sub-pixels G, and one blue sub-pixel B may correspond to two pixels. For example, a portion (for example, a right half) of an eleventh red sub-pixel R11, the green sub-pixel G, and a portion (for example, a left half) of a twelfth blue sub-pixel B12 may configure or correspond to an eleventh pixel PXL11. In "Rij", "Bij", and "PXLij", i may be a row (or a pixel row) in which a sub-pixel or a pixel is included, and j may be a column (or a pixel column) in which the sub-pixel or the pixel is included. For example, a portion (for example, a right half) of a twelfth blue sub-pixel B12, the green sub-pixel G, and a portion (for example, a left half) of a thirteenth red sub-pixel R13 may configure or correspond to a twelfth pixel PXL12. Similarly, each of other pixels PXL13 to PXL1*m*−1 (where m is a positive integer) may be configured of or may correspond to a portion of the red sub-pixel R, the green sub-pixel G, and a portion of the blue sub-pixel B. The right outermost pixel, for example, the right outermost pixel PXL1*m* of a first row ROW1 may be configured of a 1m-th blue sub-pixel B1*m* and the green sub-pixel G, but is not limited thereto.

In other words, each of one red sub-pixel R and one blue sub-pixel B may configure two adjacent pixels. For example, one twelfth blue sub-pixel B12 may express blue of an eleventh pixel PXL11 and a twelfth pixel PXL12, and one thirteenth red sub-pixel R13 may express red of the twelfth pixel PXL12 and a thirteenth pixel PXL13 may be expressed. For example, one blue sub-pixel may be shared between two pixels and one red sub-pixel may be shared between another two pixels.

In this case, the sub-pixel rendering block 142 (refer to FIG. 3) may apply a first rendering filter SPRF1 shown in FIG. 5 to the input image data DATA1. Although the first rendering filter SPRF1 is shown as a one-dimensional filter (or a filter of one dimension) having a size of 1*2, this is an example and the first rendering filter SPRF1 is not limited thereto. For example, the first rendering filter SPRF1 may have a size of 1*3 or more according to a correspondence relationship between the sub-pixels and the pixel. The first rendering filter SPRF1 may have a first component value a1 (or a first weight) and a second component value a2 (or a second weight). A total sum of the first component value a1 and the second component value a2 may be equal to or less than 1, and the first component value a1 and the second component value a2 may be variously changed within a range where the total sum is within 1.

The (1-1)-th rendering filter SPRF1-1 may include the first component value a1 and the second component value a2 each of which is ½. In this case, the sub-pixel rendering block 142 may generate the rendering data RDATA by applying the (1-1)-th rendering filter SPRF1-1 to the input image data DATA1. Referring to FIG. 4, for example, a data value for the twelfth blue sub-pixel B12 may be calculated by applying the (1-1)-th rendering filter SPRF1-1 to data values (for example, blue data values) corresponding to the eleventh pixel PXL11 and the twelfth pixel PXL12. For example, a data value for the thirteenth red sub-pixel pixel R13 may be calculated by applying the (1-1)-th rendering filter SPRF1-1 to data values (for example, red data values) corresponding to the twelfth pixel PXL12 and the thirteenth pixel PXL13. However, since each of the red sub-pixel R and the blue sub-pixel B included in a first column COL1 (or a first sub-column RBCOL in the first column COL1) corresponds to only one pixel, the sub-pixel rendering block 142 may apply a (1-2)-th rendering filter SPRF1-2 of FIG. 5 to the first column COL1 of the input image data DATA1. For example, the first component value a1 of the (1-2)-th rendering filter SPRF1-2 may be 0, and the second component value a2 of the (1-2)-th rendering filter SPRF1-2 may be ½. That is, the sub-pixel rendering block 142 may use the (1-1)-th and (1-2)-th rendering filters SPRF1-1 and SPRF1-2 that are different from each other according to a position of the data value (or the sub-pixel).

Meanwhile, only the green sub-pixel G of an m-th column COLm (or a second sub-column GCOL) is disposed on the right outermost side of the display unit 110. When the green sub-pixel G of the m-th column COLm (or the second sub-column GCOL) normally emits light (that is, emits light according to a target luminance), an unwanted vertical line of green may be visually recognized. Similarly, only the green sub-pixel G of an n-th row ROWn (where n is a positive integer) (or a second sub-row GROW) is disposed in the lower outermost side of the display unit 110, and when the green sub-pixel G of the n-th row ROWn normally emits light, a horizontal line of green may be visually recognized.

Therefore, the dimming block 143 (refer to FIG. 3) may change a data value of the green sub-pixel G of the m-th column COLm (or the second sub-column GCOL) and a data value of the green sub-pixel G of the n-th row ROWn. For example, the dimming block 143 may decrease the data value of the green sub-pixel G of the m-th column COLm (or the second sub-column GCOL) to a value lower than a target value or an initial value. For example, the dimming block 143 may decrease the data value of the green sub-pixel G of the m-th column COLm (or the second sub-column GCOL) to a value within a range from 1 to ½ times the initial value.

Only the red sub-pixel R and the blue sub-pixel B of the first row ROW1 (or a first sub-row RBROW) may be disposed on the upper outermost side of the display unit 110. For example, the topmost row may include only the red sub-pixel R and the blue sub-pixel B. When the red sub-pixel R and the blue sub-pixel B of the first row ROW1 normally emit light, a horizontal line of red, blue, or a combination thereof may be visually recognized. Similarly, only the red sub-pixel R and the blue sub-pixel B of the first column COL1 (or a first sub-column RBCOL) may be disposed on the left outermost side of the display unit 110. For example, the leftmost column may include only the red sub-pixel R and the blue sub-pixel B. When the red sub-pixel R and the blue sub-pixel B of the first column COL1 (or the first sub-column RBCOL) normally emit light, an unwanted vertical line may be visually recognized.

Therefore, the dimming block 143 may change data values of the red sub-pixel R and the blue sub-pixel B of the first row ROW1 and data values of the red sub-pixel R and the blue sub-pixel B of the first column COL1 (or the first sub-column RBCOL). For example, the dimming block 143 may decrease the data values of the red sub-pixel R and the blue sub-pixel B of the first row ROW1 to a target value or a value within a range from 1 to ½ times an initial value.

Figure 6:
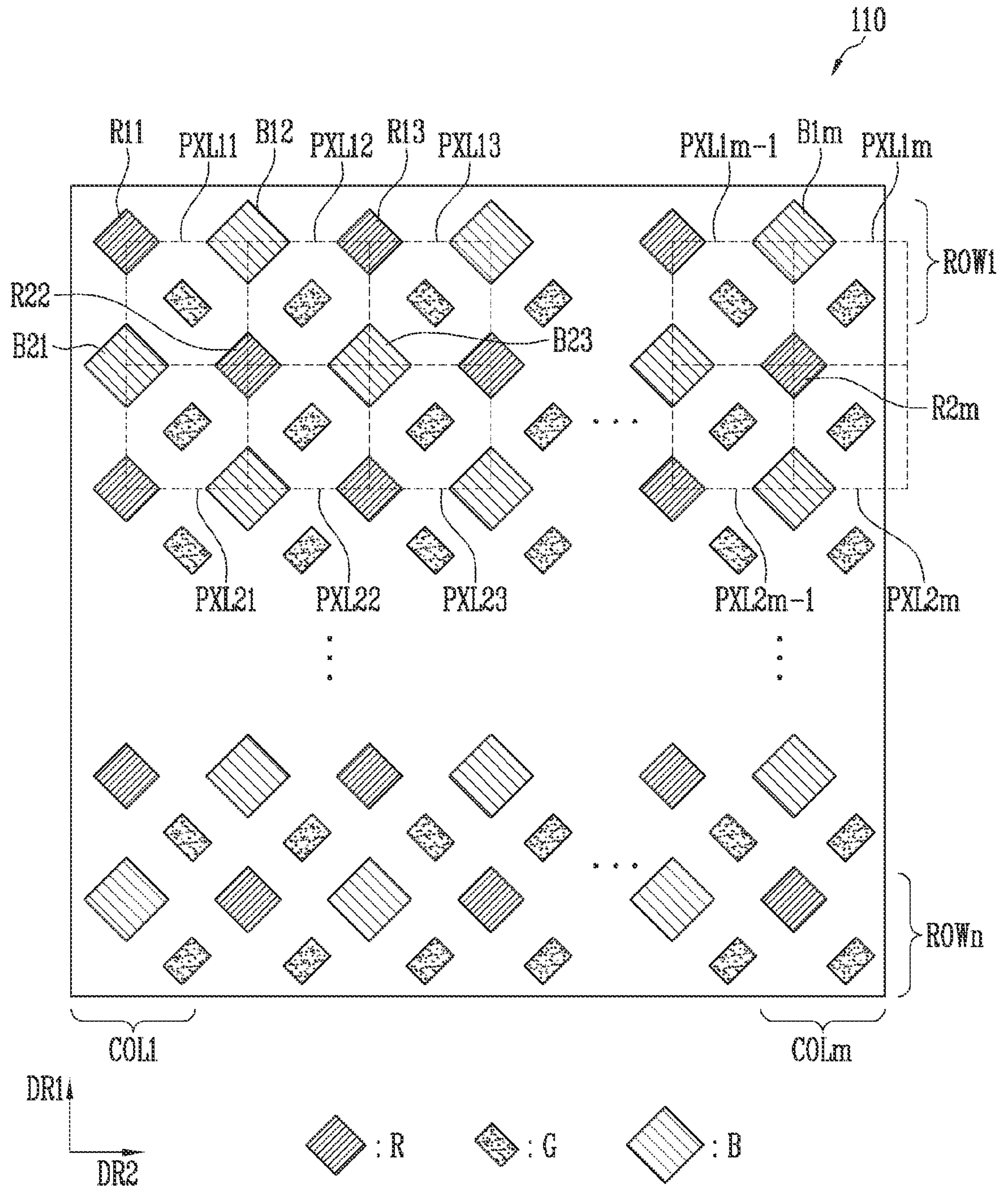
FIG. 6 is a diagram illustrating an embodiment of the display unit of FIG. 2.
Figure 7:
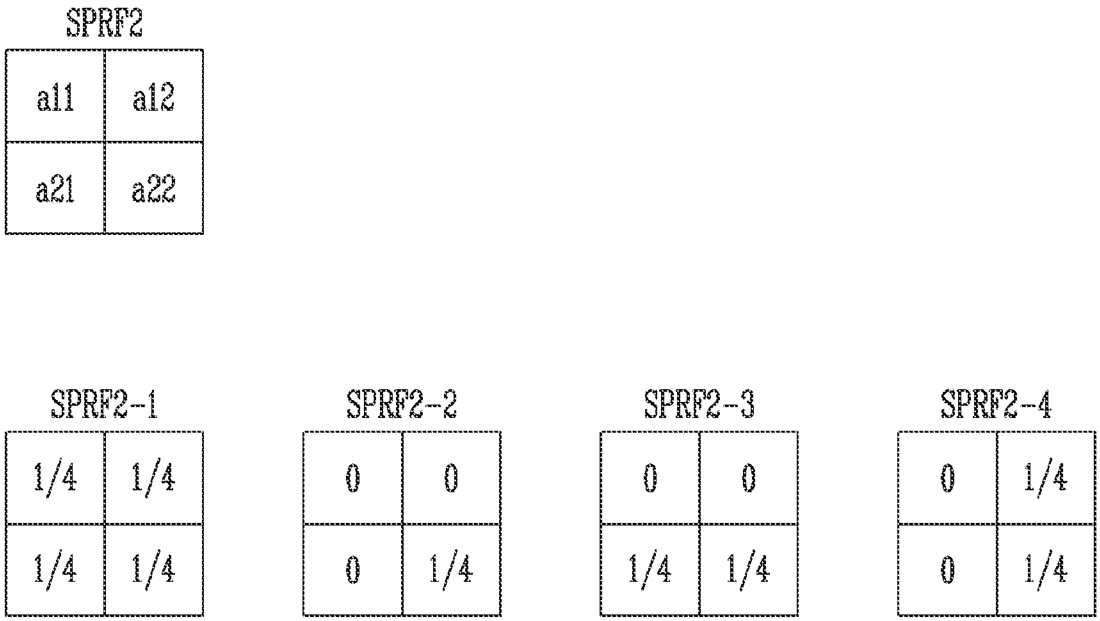
FIG. 7 is a diagram illustrating another example of the rendering filter used in the sub-pixel rendering block of FIG. 3.

FIG. 6 is a diagram illustrating an embodiment of the display unit of FIG. 2. In FIG. 6, pixels PXL11 to PXL**2*m* are further shown in relation to the sub-pixel rendering. FIG. 7 is a diagram illustrating another example of the rendering filter used in the sub-pixel rendering block of FIG. 3**.

Referring to FIGS. 1 to 3 and 6, one pixel may correspond to two red sub-pixels R, one green sub-pixel G, and two blue sub-pixels B. For example, a portion of the eleventh red sub-pixel R11, a portion of the twelfth blue sub-pixel B12, the green sub-pixel G, a portion of a twenty-first blue sub-pixel B21, and a portion of a twenty-second red sub-pixel of R22 may configure or correspond to the eleventh pixel PXL11. For example, a portion of the twelfth blue sub-pixel B12, a portion of the thirteenth red sub-pixel R13, the green sub-pixel G, a portion of the twenty-second red sub-pixel R22, and a portion of a twenty-third blue sub-pixel B23 may configure or correspond to the twelfth pixel PXL12.

In other words, each of one red sub-pixel R and one blue sub-pixel B may configure four adjacent pixels. For example, one twenty-second red sub-pixel R22 may express red of the eleventh pixel PXL11, the twelfth pixel PXL12, the twenty-first pixel PXL21, and the twenty-second pixel PXL22, and one twenty-third blue sub-pixel B23 may express blue of the twelfth pixel PXL12, the thirteenth pixel PXL13, the twenty-second pixel PXL22, and the twenty-third pixel PXL23. For example, one 2m-th red sub-pixel R**2*m* may express red of a (1m−1)-pixel PXL1*m*−1, a 1m-th pixel PXL1*m*, a (2m−1)-pixel PXL2*m*−1, and a 2m-th pixel PXL2*m***.

In this case, the sub-pixel rendering block 142 (refer to FIG. 3) may apply a second rendering filter SPRF2 shown in FIG. 7 to the input image data DATA1. Although the second rendering filter SPRF2 is shown as a two-dimensional filter having a size of 2*2, this is an example and the second rendering filter SPRF2 is not limited thereto. For example, the second rendering filter SPRF2 may have a size of 2*1, 2*3, 3*2, and 3*3 or more according to the correspondence relationship between the sub-pixels and the pixel. The second rendering filter SPRF2 may have an eleventh component value a11 (or an eleventh weight), a twelfth component value a12 (or a twelfth weight), a twenty-first component value a21 (or a twenty-first weight), and a twenty-second component value a22 (or a twenty-second weight). A total sum of the component values a11 to a22 may be equal to or less than 1, and the component values a11 to a22 may be variously changed within a range where the total sum is within 1.

A (2-1)-th rendering filter SPRF2-1 may include the component values a11 to a22 each of which is ¼. In this case, the sub-pixel rendering block 142 may generate the rendering data RDATA by applying the (2-1)-th rendering filter SPRF2-1 to the input image data DATA1. Referring to FIG. 6, for example, a data value for the twenty-second sub-pixel may be calculated by applying the (2-1)-th rendering filter SPRF2-1 to data values (for example, red data values) corresponding to the eleventh pixel PXL11, the twelfth pixel PXL12, the twenty-first pixel PXL21, and the twenty-second pixel PXL22.

However, since the eleventh red sub-pixel R11 included in the first row ROW1 and the first column COL1 corresponds to only one pixel, the sub-pixel rendering block 142 may apply the (2-2)-th rendering filter SPRF2-2 of FIG. 7 to the input image data DATA1 for the eleventh red sub-pixel R11. In addition, since each of the red sub-pixel R and the blue sub-pixel B included in the first row ROW1 corresponds to only two pixels, the sub-pixel rendering block 142 may apply a (2-3)-th rendering filter SPRF2-3 of FIG. 7 to the input image data DATA1 for the red sub-pixel R and the blue sub-pixel B in the first row ROW1. Similarly, since each of the red sub-pixel R and the blue sub-pixel B included in the first column COL1 corresponds to only two pixels, the sub-pixel rendering block 142 may apply a (2-4)-th rendering filter SPRF2-4 of FIG. 7 to the input image data DATA1 for the red sub-pixel R and the blue sub-pixel B in the first column COL1. That is, the sub-pixel rendering block 142 may use the rendering filters SPRF2-1 to SPRF2-4 different from each other according to the position of the data value (or the sub-pixel).

Meanwhile, even in this case, since an unwanted green line may be visually recognized in the m-th column COLm that is the right outermost side of the display unit 110 and/or the n-th row ROWn that is the lower outermost side of the display unit 110, the dimming block 143 (refer to FIG. 3) may change the data value of the green sub-pixel G of the m-th column COLm and the data value of the green sub-pixel G of the n-th row ROWn. Similarly, since an unwanted line (for example, a line of red, blue, or a combination thereof) may be visually recognized in the first row ROW1 that is the upper outermost side of the display unit 110 and/or the first column COL1 that is the left outermost side of the display unit 110, the dimming block 143 may change data values of the red sub-pixel R and the blue sub-pixel B of the first row ROW1 and data values of the red sub-pixel R and the blue sub-pixel B of the first column COL1.

As described above, the timing controller 140_C (refer to FIG. 3) according to the comparative embodiment may use several rendering filters in performing the sub-pixel rendering, and may dim only data values corresponding to the sub-pixels positioned at the outermost edge after the sub-pixel rendering.

Figure 8:
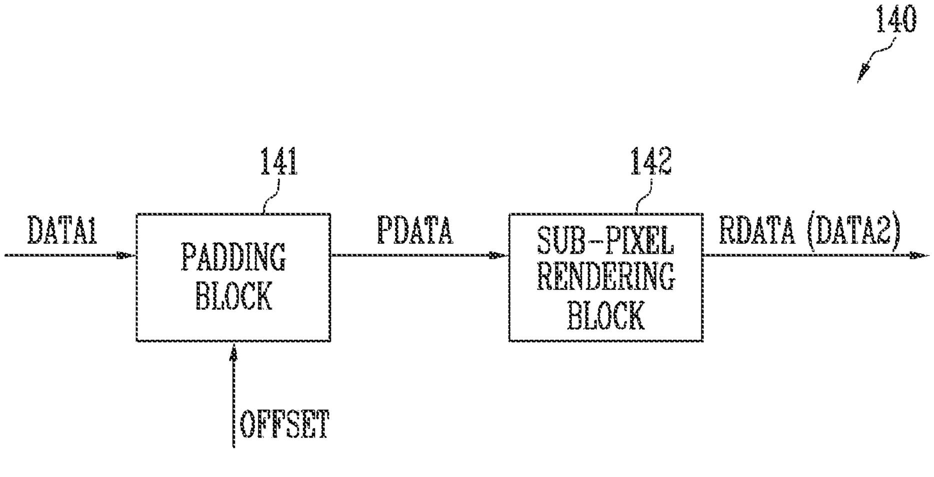
FIG. 8 is a diagram illustrating an embodiment of the timing controller included in the display device of FIG. 1.

FIG. 8 is a diagram illustrating an embodiment of the timing controller included in the display device of FIG. 1. In FIG. 8, the timing controller 140 is briefly shown based on the function of converting the input image data DATA1 into the image data DATA2.

Referring to FIGS. 1, 2, and 8, the timing controller 140 (or the data processor) may include a padding block 141 (or a padding circuit) and the sub-pixel rendering block 142 (or the sub-pixel rendering circuit). Since the sub-pixel rendering block 142 is substantially identical or similar to the sub-pixel rendering block 142 described with reference to FIGS. 3 to 7, an overlapping description is not repeated. The padding block 141 may be implemented as hardware by including a logic circuit, a memory device, or the like, or may be implemented as software that performs some functions in a processor (or an integrated circuit).

In an embodiment, the padding block 141 generates padding data PDATA or convert the input image data DATA1 into the padding data PDATA by adding a padding value to at least one of a front end and a rear end of each line data in the input image data DATA1 (or the first frame data).

In an embodiment, the padding block 141 determines the padding value based on an offset value OFFSET. The offset value OFFSET may be preset during a manufacturing process of the display device 100 or may be provided from an external device (for example, a separate input terminal for setting). For example, the offset value OFFSET may have a value within a range of 0 to 1. For example, the offset value OFFSET may be 0. In this case, an operation of the padding block 141 adding the padding value (for example, a value of 0 or a grayscale value of 0) corresponding to the offset value OFFSET may be referred to as zero padding.

In an embodiment, when the padding value is added to line data, the offset value OFFSET may indicate a ratio between the padding value and a data value adjacent thereto. For example, when an adjacent data value is 255 (or a grayscale of 255), a padding value of 1 may indicate 255. In another embodiment, the offset value OFFSET may be a value obtained by converting a range (or a grayscale range) of the data value into a range of 0 to 1. For example, the offset value OFFSET may be a value obtained by converting a grayscale range of 0 to 255 into a range of 0 to 1.

The sub-pixel rendering block 142 may generate the rendering data RDATA from the padding data PDATA using the sub-pixel rendering technique (or algorithm). The rendering data RDATA obtained from the padding data PDATA may be used as the image data DATA2 without additional data processing.

Figure 9:
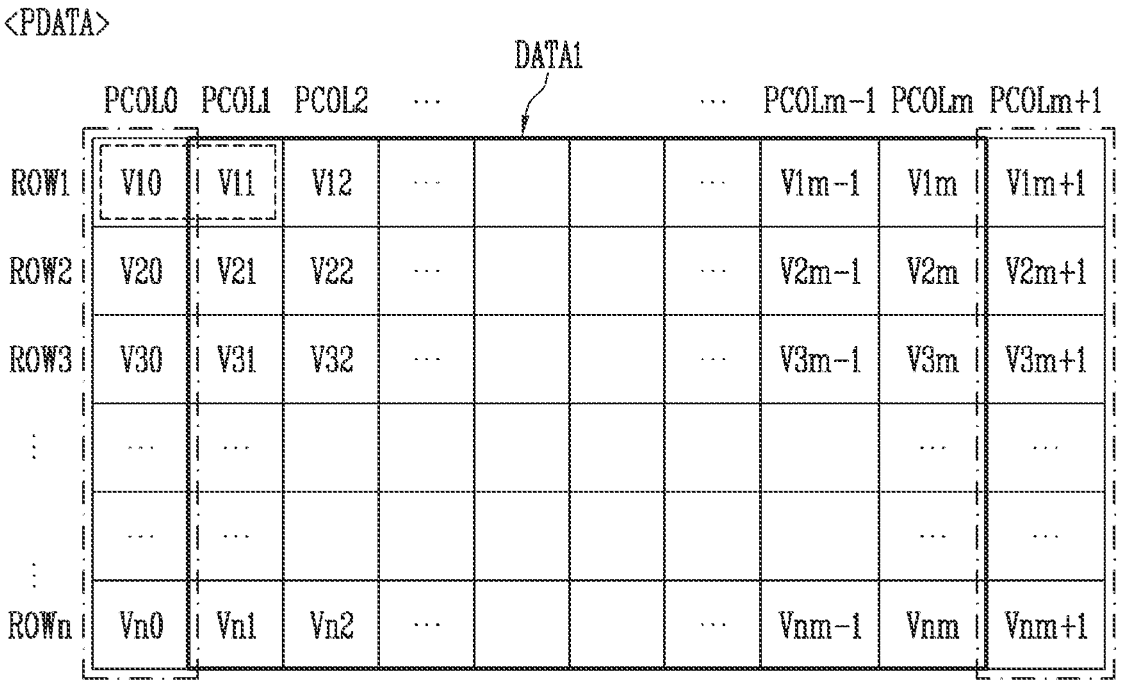
FIG. 9 is a diagram illustrating an embodiment of padding data generated by the timing controller of FIG. 8.
Figure 10:
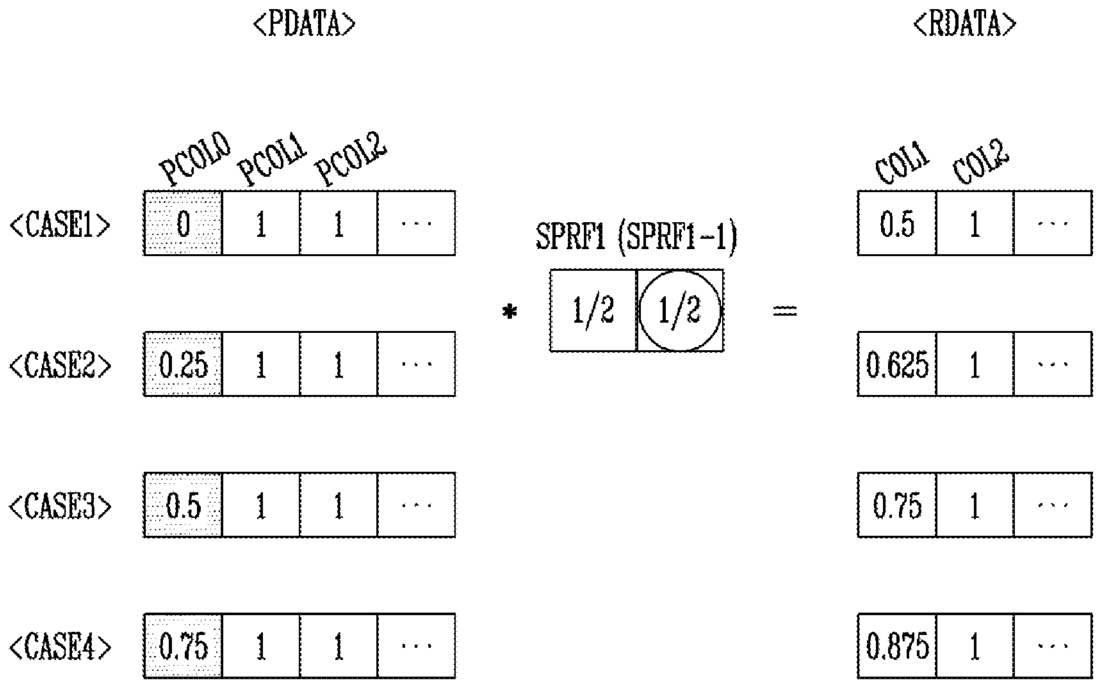
FIGS. 10 and 11 are diagrams illustrating an operation of the timing controller of FIG. 8.
Figure 11:
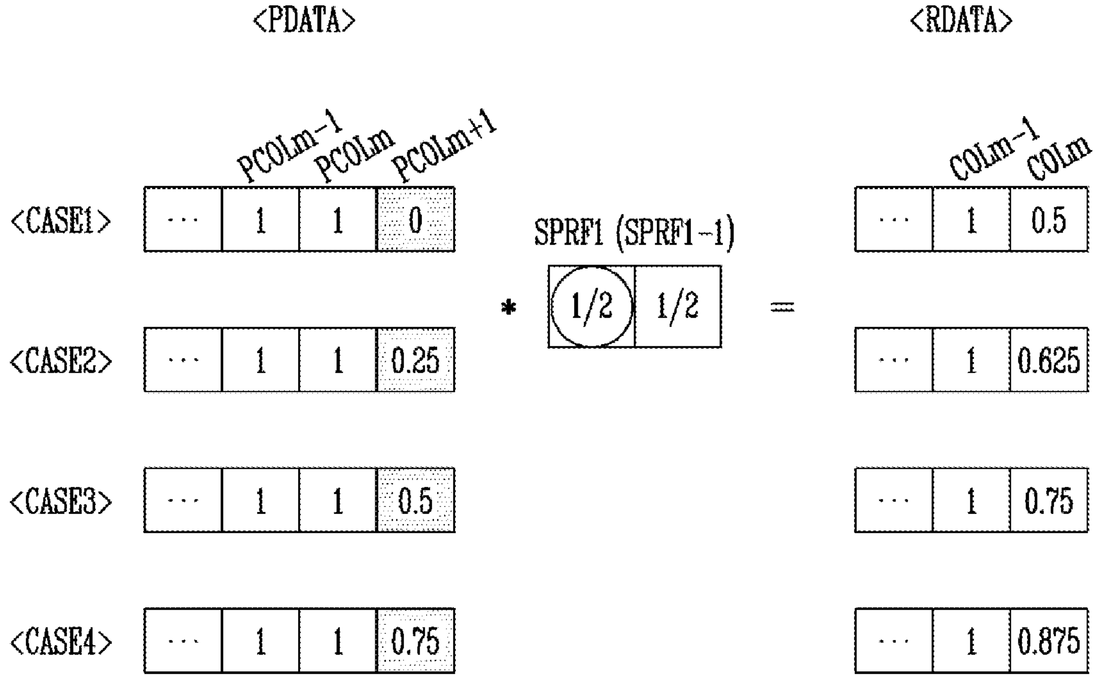

FIGS. 9 to 11 may be referred to for describing an operation of the padding block 141 and the sub-pixel rendering block 142.

FIG. 9 is a diagram illustrating an embodiment of the padding data generated by the timing controller of FIG. 8. FIGS. 10 and 11 are diagrams illustrating an operation of the timing controller of FIG. 8.

Referring to FIG. 9, the input image data DATA1 may include data values V11 to Vnm corresponding to rows ROW1 to ROWn and pixel columns PCOL1 to PCOLm. The pixel columns PCOL1 to PCOLm may respectively correspond to the pixels PXL11 to PXL1*m* described with reference to FIG. 4. For convenience of description, it is assumed that the data values V11 to Vnm correspond to data values of a specific color of a pixel (for example, a red data value corresponding to a red sub-pixel, a blue data value corresponding to a blue sub-pixel, or a green data value corresponding to a green sub-pixel). Data values included in each of the rows ROW1 to ROWn may configure line data. For example, data values V11 to V1*m* included in a first row ROW1 may configure first line data, data values V21 to V2*m* included in a second row ROW2 may configure second line data, and data values V31 to V3*m* included in a third row ROW3 may configure third line data. Data values Vn1 to Vnm included in an n-th row ROWn may configure n-th line data.

The padding data PDATA may include data values V10 to Vn0 included in a 0-th pixel column PCOL0 that is a front end of the input image data DATA1 and/or data values V1*m*+1 to Vnm+1 included in an (m+1)-th pixel column PCOLm+1 that is a rear end of the input image data DATA1. Each of the data values V10 to Vn0 of the 0-th pixel column PCOL0 and the data values V1*m*+1 to Vnm+1 of the (m+1)-th pixel column PCOLm+1 may be the padding value.

In an embodiment, when the padding block 141 (refer to FIG. 8) adds the padding value to a front end of each line data, the padding data PDATA may further include data values V10 to Vn0 included in the 0-th pixel column PCOL0 in addition to the input image data DATA1.

In this case, as shown in FIG. 10, the sub-pixel rendering block 142 (refer to FIG. 8) may calculate the rendering data RDATA by applying the first rendering filter SPRF1 to the padding data PDATA. Differently from the embodiments described with reference to FIGS. 3 and 4, the sub-pixel rendering block 142 may calculate the rendering data RDATA by collectively applying one first rendering filter SPRF1 (for example, the (1-1)-th rendering filter SPRF1-1) to the padding data PDATA.

For convenience of description, in FIG. 10, data values included in pixel columns PCOL1, PCOL2, . . . are expressed as 1, and the data value (that is, the padding value) included in the 0-th pixel column PCOL0 is expressed as the offset value OFFSET (refer to FIG. 8). For example, when the data values included in the pixel columns PCOL1, PCOL2, . . . have a grayscale value of 100, a data value (that is, a padding value) of 0 included in the 0-th pixel column PCOL0 may include a grayscale value of 0, and a data value (that is, a padding value) of 0.25 included in the 0-th pixel column PCOL0 may indicate a grayscale value of 25. In addition, in FIG. 10, various cases CASE1 to CASE4 are shown according to the offset value OFFSET.

First, in a first case CASE1, the offset value OFFSET may be 0. In this case, the data value (that is, the padding value) included in the 0-th pixel column PCOL0 may be 0. The sub-pixel rendering block 142 may sequentially apply the (1-1)-th rendering filter SPRF1-1 to the padding data PDATA. For example, the sub-pixel rendering block 142 may multiply the padding data PDATA and the (1-1)-th rendering filter SPRF1-1, and apply the (1-1)-th rendering filter SPRF1-1 to a current data value and a previous data value in line data of the padding data PDATA. In this case, the data value of the first column COL1 of the rendering data RDATA may be calculated as 0.5 (that is, $0*1/2+1*1/2=0.5$), and the data value of the second column COL2 of the rendering data RDATA may be calculated as 1 (that is, $1*1/2+1*1/2=1$). That is, the sub-pixel rendering block 142 may adjust the data values of the first column COL1 without using the (1-2)-th rendering filter SPRF1-2 of FIG. 5. Furthermore, when the offset value OFFSET is adjusted, similar to the function of the dimming block 143 of FIG. 3, the data values of the first column COL1 may be changed (or dimmed).

For example, in the second case CASE2, the offset value OFFSET may be 0.25. In this case, the data value (that is, the padding value) included in the 0-th pixel column PCOL0 may be 0.25, and the data value of the first column COL1 of the rendering data RDATA may be calculated as 0.625 (that is, 0.25*1/2+1*1/2=0.625). That is, the data values of the first column COL1 may be changed (or dimmed).

As another example, in a third case CASE3, the offset value OFFSET may be 0.5. In this case, the data value (that is, the padding value) included in the 0-th pixel column PCOL0 may be 0.5, and the data value of the first column COL1 of the rendering data RDATA may be calculated as 0.75 (that is, 0.5*1/2+1*1/2=0.75).

As still another example, in a fourth case CASE4, the offset value OFFSET may be 0.75. In this case, the data value (that is, the padding value) included in the 0-th pixel column PCOL0 may be 0.875, and the data value of the first column COL1 of the rendering data RDATA may be calculated as 0.875 (that is, 0.75*1/2+1*1/2=0.875).

Meanwhile, although a case where the padding data PDATA further includes the data values V10 to Vn0 included in the 0-th pixel column PCOL0 is described, the disclosure is not limited thereto.

In an embodiment, when the padding block 141 adds the padding value to a rear end of each line data, as shown in FIG. 9, the padding data PDATA may further include data values V1*m*+1 to Vnm+1 included in an (m+1)-th pixel column PCOLm+1 in addition to the input image data DATA1.

In this case, as shown in FIG. 11, the sub-pixel rendering block 142 (refer to FIG. 8) may calculate the rendering data RDATA by applying the first rendering filter SPRF1 to the padding data PDATA.

For convenience of description, in FIG. 11, data values included in the (m−1)-th pixel column PCOLm−1 and the m-th pixel column PCOLm are expressed as 1, and a data value (that is, a padding value) included in the (m+1)-th pixel column PCOLm+1 is expressed as the offset value OFFSET (refer to FIG. 8).

First, in the first case CASE1, the offset value OFFSET may be 0. In this case, the data value (that is, the padding value) included in the (m+1)-th pixel column PCOLm+1 may be 0. The sub-pixel rendering block 142 may sequentially apply the (1-1)-th rendering filter SPRF1-1 to the padding data PDATA. For example, the sub-pixel rendering block 142 may multiply the padding data PDATA and the (1-1)-th rendering filter SPRF1-1, and apply the (1-1)-th rendering filter SPRF1-1 to a current data value and a subsequent data value in the line data of the padding data PDATA. In this case, the data value of the (m−1)-th column COLm−1 of the rendering data RDATA may be calculated as 1 (that is, 1*1/2+1*1/2=1), and the data value of the m-th column COLm of the rendering data RDATA may be calculated as 0.5 (that is, 1*1/2+O*1/2=0.5). That is, similar to the function of the dimming block 143 of FIG. 3, the data values of the m-th column COLm may be changed (or dimmed).

For example, in the second case CASE2, the offset value OFFSET may be 0.25. In this case, the data value (that is, the padding value) included in the (m+1)-th pixel column PCOLm+1 may be 0.25, and the data value of the m-th column COLm of the rendering data RDATA may be calculated as 0.625 (that is, 1*1/2+0.25*1/2=0.625).

As another example, in the third case CASE3, the offset value OFFSET may be 0.5. In this case, the data value (that is, the padding value) included in the (m+1)-th pixel column PCOLm+1 may be 0.5, and the data value of the m-th column COLm of the rendering data RDATA may be calculated as 0.75 (that is, 1*1/2+0.5*1/2=0.75).

As still another example, in the fourth case CASE4, the offset value OFFSET may be 0.75. In this case, the data value (that is, the padding value) included in the 0-th pixel column PCOL0 may be 0.75, and the data value of the first column COL1 of the rendering data RDATA may be calculated as 0.825 (that is, 1*1/2+0.75*1/2=0.75).

As described above, the timing controller 140 (or the data processor) may add the padding value to the input image data DATA1 to obtain the normal rendering data RDATA with only one rendering filter. In addition, the offset value OFFSET for the padding value may be changed to obtain the same rendering data RDATA as the various dimming-processed data without the dimming block 143 (refer to FIG. 3).

For reference, for applying the rendering filter to the input image data DATA1, the sub-pixel rendering block 142 may include a memory for storing the input image data DATA1, for example, a line memory for storing the input image data DATA1 in line data unit. In this case, a padding operation of adding the padding value to the line data may be provided by increasing a capacity of the line memory by several bits. With an operation of adding the padding value to the line data when storing the line data in the line memory, the operation of the sub-pixel rendering block 142 may be simplified (for example, the sub-pixel rendering algorithm may be simplified), and the dimming block 143 may be omitted. Therefore, an unnecessary power consumption increase generated in an operation process for the sub-pixel rendering and/or dimming (or dimming of the dimming block 143) may be prevented.

Figure 12:
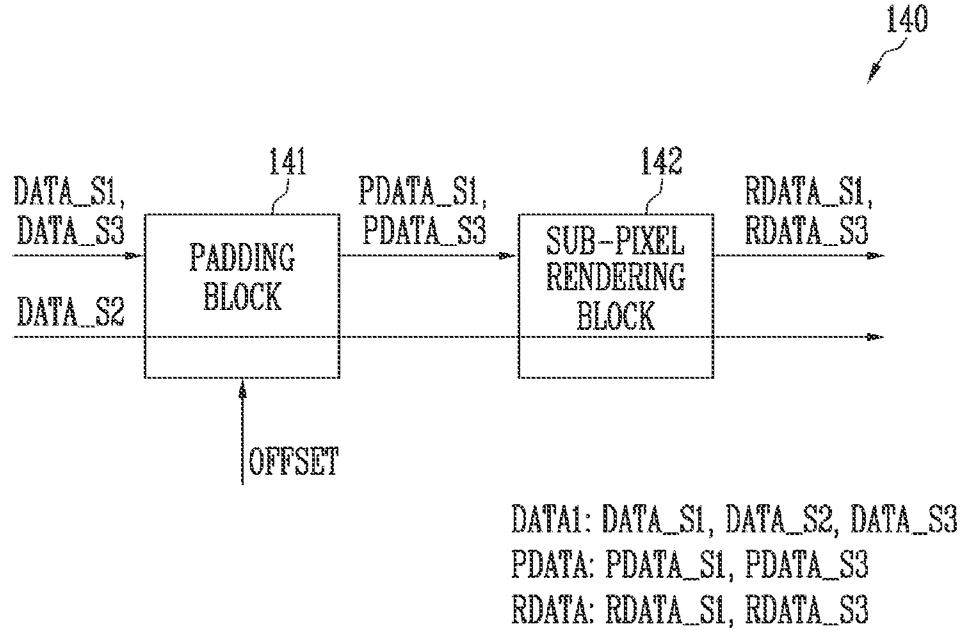
FIG. 12 is a diagram illustrating an embodiment of the timing controller of FIG. 8.
Figure 13:
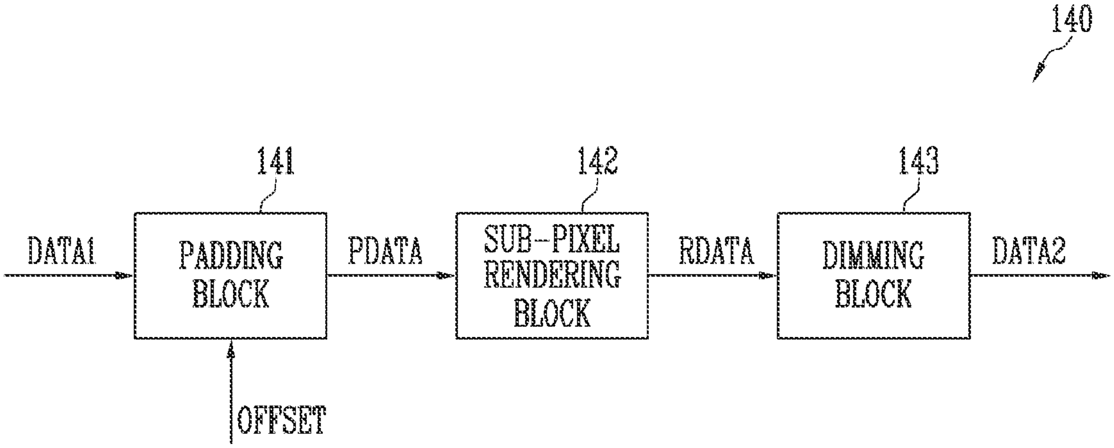
FIG. 13 is a diagram illustrating an embodiment of the timing controller of FIG. 8.

FIG. 12 is a diagram illustrating an embodiment of the timing controller of FIG. 8. FIG. 13 is a diagram illustrating an embodiment of the timing controller of FIG. 8.

First, referring to FIGS. 8 and 12, the timing controller 140 (or the data processor) of FIG. 12 is substantially identical or similar to the timing controller 140 of FIG. 8 except for the data DATA1, PDATA, and RDATA. Therefore, an overlapping description is not repeated.

In an embodiment, the input image data DATA1 (or the first frame data)) may include first color data DATA_S1, second color data DATA_S2, and third color data DATA_S3. Referring to FIG. 2, for example, the first color data DATA_S1 may be data for the red sub-pixels R, the second color data DATA_S2 may be data for the green sub-pixels G, and the third color data DATA_S3 may be data for the blue sub-pixels B.

In an embodiment, the padding block 141 (e.g., a logic circuit) generates first padding data PDATA_S1 by adding the padding value to the first color data DATA_S1, and the sub-pixel rendering block 142 (e.g., a logic circuit) generates first rendering data RDATA_S1 by applying the rendering filter to the first padding data PDATA_S1. In addition, the padding block 141 may generate third padding data PDATA_S3 by adding the padding value to the third color data DATA_S3, and the sub-pixel rendering block 142 may generate third rendering data RDATA_S3 by applying the rendering filter to the third padding data PDATA_S3. The first padding data PDATA_S1 and the third padding data PDATA_S3 may be included in the padding data PDATA, and the first rendering data RDATA_S1 and the third rendering data RDATA_S3 may be included in the rendering data RDATA. Meanwhile, the padding block 141 and the sub-pixel rendering block 142 may bypass the second color data DATA_S2. In an embodiment, the second color data DATA_S2 passes through the padding block 141 and the sub-pixel rendering block 142 without being altered.

Referring to FIG. 4, for example, a separate rendering filter may be required to be applied only to the red sub-pixel R and the blue sub-pixel B included in the first column COL1 of FIG. 4. Accordingly, as described with reference to FIG. 10, the padding block 141 may add the padding value only to each of the first color data DATA_S1 and the third color data DATA_S3, and the sub-pixel rendering block 142 may apply the rendering filter only to each of the first padding data PDATA_S1 and the third padding data PDATA_S3. Meanwhile, when the dimming process is not considered, application of the rendering filter to the green sub-pixel G of FIG. 4 may not be required. Accordingly, the padding block 141 and the sub-pixel rendering block 142 may bypass the second color data DATA_S2.

Meanwhile, although it has been described that the padding block 141 and the sub-pixel rendering block 142 bypass the second color data DATA_S2 in FIG. 12, the disclosure is not limited thereto. For the dimming process for the data value of the green sub-pixel G included in the m-th column COLm of FIG. 4, as described with reference to FIG. 11, the padding block 141 may generate second padding data by adding the padding value to the second color data DATA_S2, and the sub-pixel rendering block 142 may apply the rendering filter to the second padding data.

As in the embodiment of FIG. 12, when the second color data DATA_S2 is bypassed, a dimming process for the second color data DATA_S2 is not performed. In consideration of this, the timing controller 140 may further include the dimming block 143. Since the dimming block 143 of FIG. 13 is substantially identical or similar to the dimming block 143 of FIG. 3, an overlapping description is not repeated.

Referring to FIG. 4, for example, the dimming block 143 may change or dim the data values of the green sub-pixel G corresponding to the outermost edge of the display unit 110, that is, the data value of the green sub-pixel G of the m-th column COLm and the data value of the green sub-pixel G of the n-th row ROWn. In addition, the dimming block 143 may change or dim the data values of the data values of the red sub-pixel R and the blue sub-pixel B of the first row ROW1. Since the data values of the red sub-pixel R and the blue sub-pixel B of the first column COL1 are substantially dimmed through the padding operation and the sub-pixel rendering operation, the dimming block 143 may not perform separate processing on the data values of the red sub-pixel R and the blue sub-pixel B of the first column COL1.

Compared to the timing controller 140_C of FIG. 3, the timing controller 140 according to the embodiment of FIG. 13 may also simplify the sub-pixel rendering operation and the dimming operation and prevent an unnecessary power consumption increase.

Figure 14:
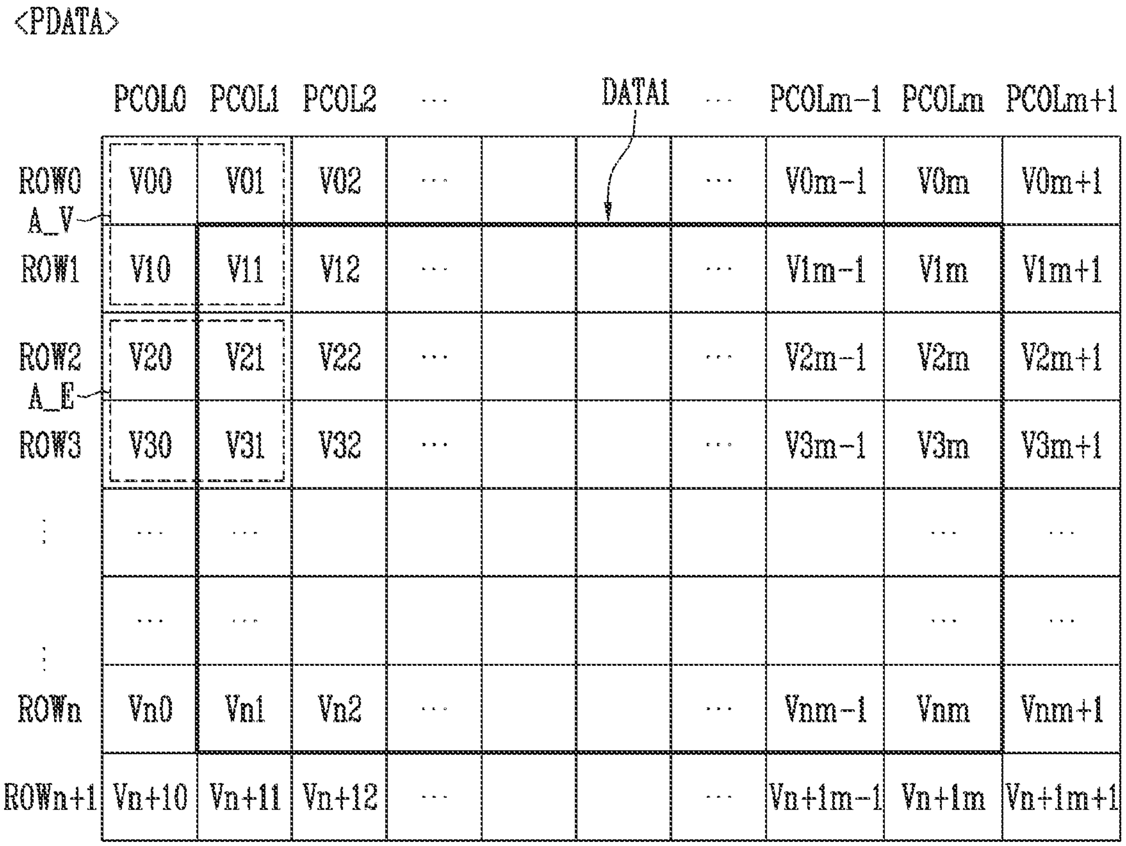
FIG. 14 is a diagram illustrating an embodiment of the padding data generated by the timing controller of FIG. 8.
Figure 15A:
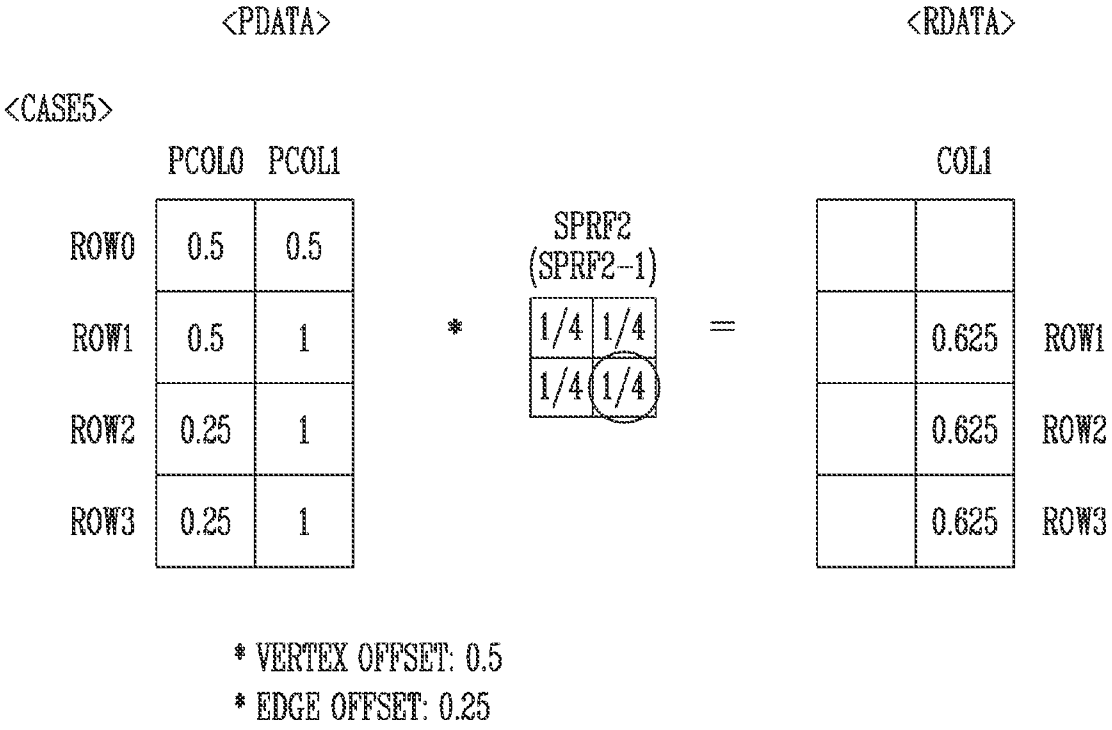
FIGS. 15A and 15B are diagrams illustrating an operation of the timing controller of FIG. 8.
Figure 15B:
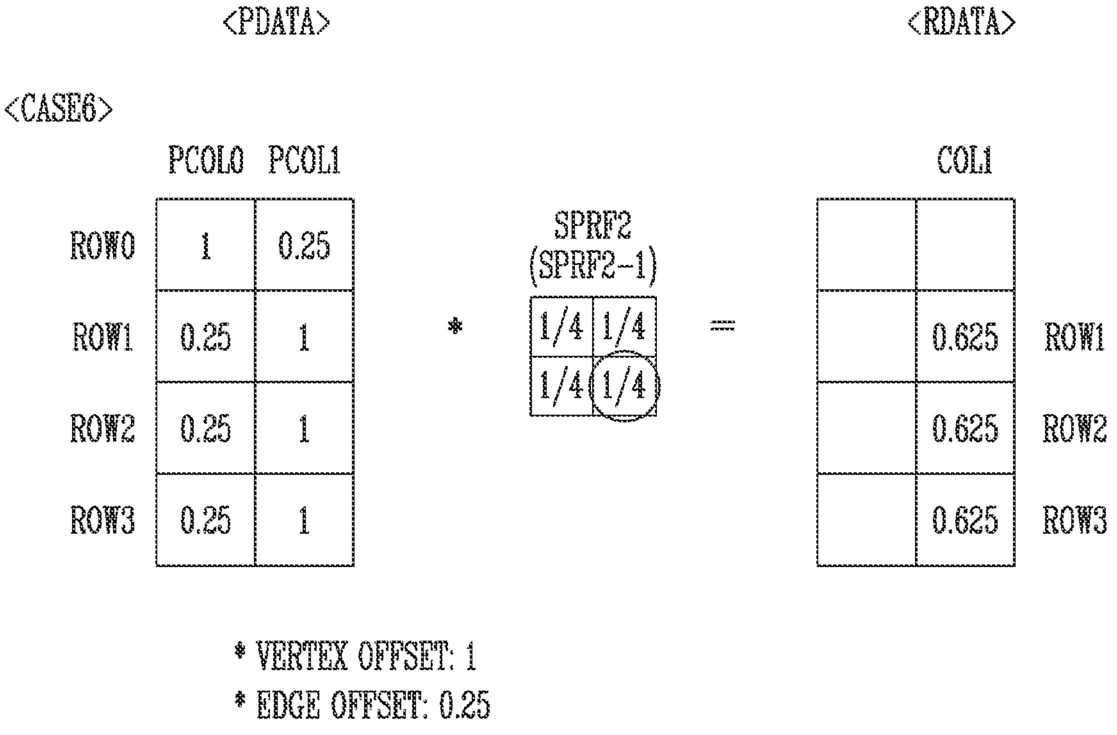

FIG. 14 is a diagram illustrating an embodiment of the padding data generated by the timing controller of FIG. 8. FIGS. 15A and 15B are diagrams illustrating the operation of the timing controller of FIG. 8.

Referring to FIGS. 8, 9, and 14, the padding data PDATA may further include padding line data (or dummy line data) at the front end and/or the rear end of the input image data DATA1. For example, the padding data PDATA may further include data values VO0 to V0$m$+1 included in the 0-th row ROW0 and/or data values Vn+10 to Vn+1m+1 included in an (n+1)-th row ROWn+1.

For example, the padding block 141 (refer to FIG. 8) may generate the padding line data by applying a first offset value VERTEX OFFSET (refer to FIG. 15A) and a second offset value EDGE OFFSET (refer to FIG. 15A). For example, the padding block 141 may calculate a first value of the padding line data by applying the first offset value VERTEX OFFSET to a first value of the line data corresponding to the first row ROW1, and calculate at least a remaining value of the padding line data by applying the second offset value EDGE OFFSET to at least one remaining value except for the first value of the line data.

In an embodiment, when the padding block 141 adds the padding line data to a front end of the padding data PDATA, the padding data PDATA may further include the data values VO0 to V0$m$+1 included in the 0-th row ROW0.

In this case, as shown in FIGS. 15A and 15B, the sub-pixel rendering block 142 (refer to FIG. 8) may calculate the rendering data RDATA by applying the second rendering filter SPRF2 to the padding data PDATA. Differently from the embodiments described with reference to FIGS. 6 and 7, the sub-pixel rendering block 142 may calculate the rendering data RDATA by collectively applying one second rendering filter SPRF2 (for example, the (2-1)-th rendering filter SPRF2-1) to the padding data PDATA.

For example, in a fifth case CASE5 of FIG. 15A, the first offset value VERTEX OFFSET may be 0.5, and the second offset value EDGE OFFSET may be 0.25. The first offset value VERTEX OFFSET may be an offset value set for portions corresponding to a corner area A_V of FIG. 14, for example, four corners of the display unit 110 of FIG. 2, and the second offset value EDGE OFFSET may be an offset value set for portions other than the corner portions among edges of an edge area A_E of FIG. 14, for example, edges of the display unit 110. In this case, padding values added to the 0-th row ROW0 and the first row ROW1 may be 0.5, and padding values added to remaining rows ROW2 and ROWS of the first column PCOL0 may be 0.25.

The sub-pixel rendering block 142 may sequentially apply the (2-1)-th rendering filter SPRF2-1 to the padding data PDATA. For example, the sub-pixel rendering block 142 may multiply the padding data PDATA and the (2-1)-th rendering filter SPRF2-1, and may apply the (2-1)-th rendering filter SPRF2-1 to the current data value in the line data of the padding data PDATA and a data value of previous line data. In this case, based on the first column COL1 of the rendering data RDATA, the data value of the first row ROW1 may be calculated as 0.625 (that is, 0.5*1/4+0.5*1/4+0.5*1/4+1*1/4=0.625), the data value of the third row ROW3 may be calculated as 0.625 (that is, 0.25*1/4+1*1/4+0.25*1/4+1*1/4=0.625).

As another example, in a sixth case CASE6 of FIG. 15B, the first offset value VERTEX OFFSET may be 1, and the second offset value EDGE OFFSET may be 0.25. The first offset value VERTEX OFFSET may be applied only to the padding values of the 0-th row ROW0 and the 0-th pixel column PCOL0, and the second offset value EDGE OFFSET may be applied to remaining padding values except for the padding value.

In this case, based on the first column COL1 of the rendering data RDATA, the data value of the first row ROW1 may be calculated as 0.625 (that is, 1*1/4+0.25*1/4+0.25*1/4+1*1/4=0.625), and a data value of each of the second row ROW2 and the third row ROW3 may be calculated as 0.625 (that is, 0.25*1/4+1*1/4+0.25*1/4+1*1/4=0.625).

That is, the first offset value VERTEX OFFSET may be set for at least one padding value of the edge area A_V of FIG. 14, and may be different from the second offset value EDGE OFFSET set for the edge area A_E of FIG. 14. Accordingly, data values positioned at an edge of the rendering data RDATA may be uniformly changed (or dimmed).

Figure 16:
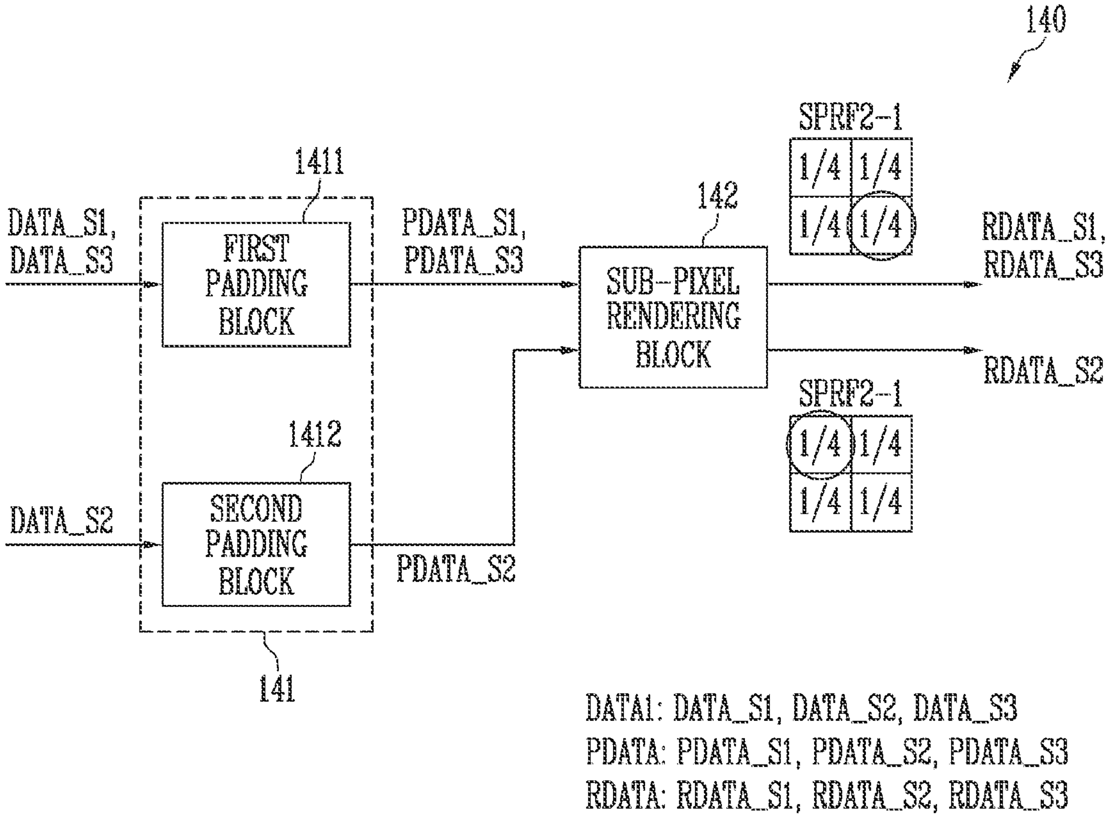
FIG. 16 is a diagram illustrating an embodiment of the timing controller of FIG. 8.
Figure 17:
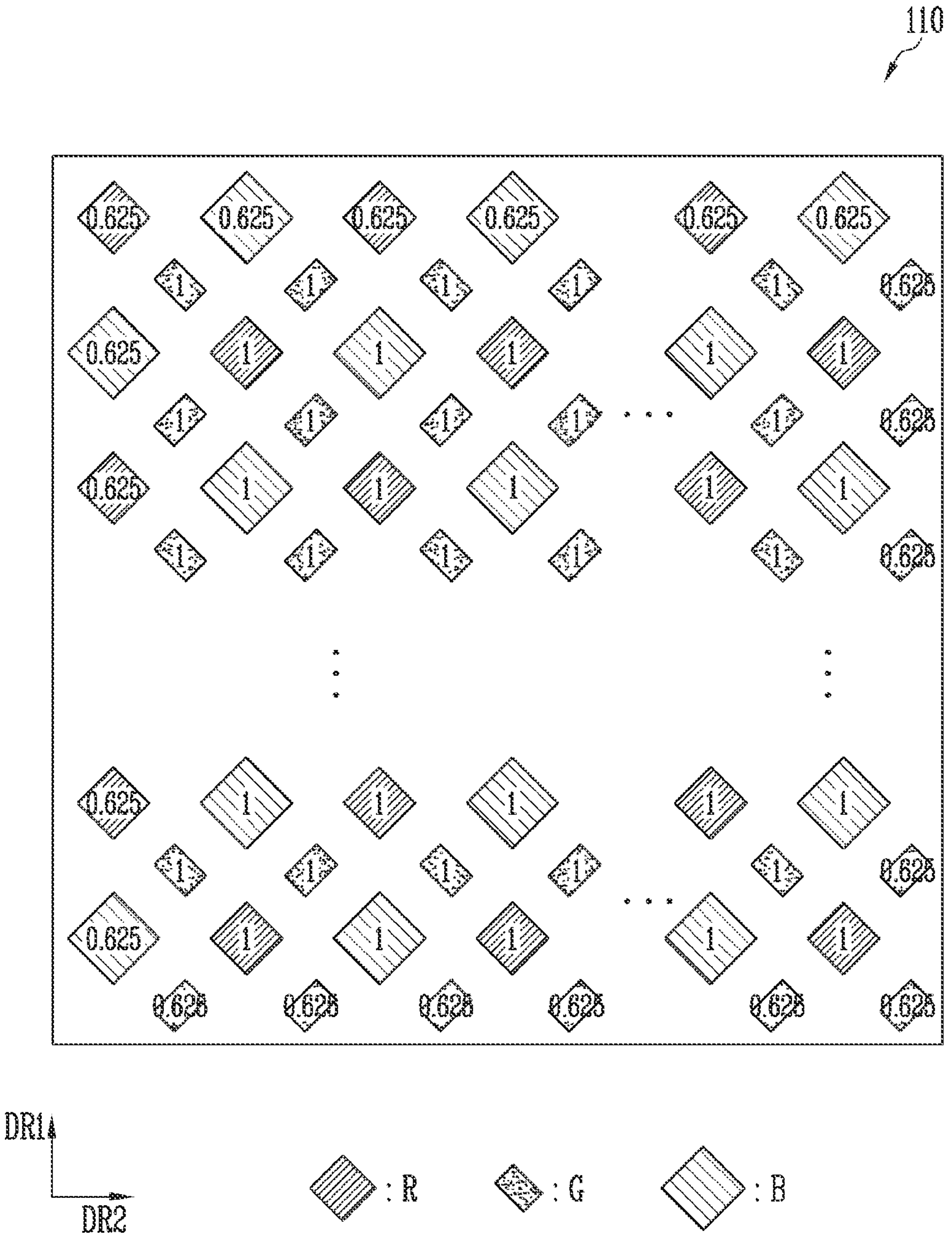
FIG. 17 is a diagram illustrating an embodiment of the display unit of FIG. 2.

FIG. 16 is a diagram illustrating an embodiment of the timing controller of FIG. 8. FIG. 17 is a diagram illustrating an embodiment of the display unit of FIG. 2. FIG. 17 further shows data values according to an operation of the timing controller of FIG. 16.

Referring to FIGS. 8, 12, and 14 to 16, the timing controller 140 (or data processor) of FIG. 16 may be substantially identical or similar to the timing controller 140 of FIG. 12, except for processing on the second color data DATA_S2. Therefore, an overlapping description is not repeated.

In an embodiment, the padding block 141 includes a first padding block 1411 (or a first padding circuit) and a second padding block 1412.

The first padding block 1411 may generate the first padding data PDATA_S1 by adding the padding value (and the padding line data) described with reference to FIG. 14 to the first color data DATA_S1, and the sub-pixel rendering block 142 may generate the first rendering data RDATA_S1 by applying the rendering filter to the first padding data PDATA_S1. For example, the first padding block 1411 may add the padding line data of the 0-th row ROW0 of FIG. 14 to the first color data DATA_S1. When the (2-1)-th rendering filter SPRF2-1 is applied to the first rendering data RDATA_S1, the current data value and the data value of the previous line data may be substantially calculated, and thus the first rendering data RDATA_S1 may be generated.

In this case, as shown in FIG. 17, each of the data values of the red sub-pixel R positioned at the outermost edge of the display unit 110 may be dimmed. For example, the red sub-pixel R positioned at the outermost edge of the display unit 110 may have the data value of 0.625 described with reference to FIGS. 15A and 15B. Meanwhile, the red sub-pixel R positioned inside the display unit 110 except for the outermost edge may have a data value of 1.

In addition, the first padding block 1411 may generate the third padding data PDATA_S3 by adding the padding value (and the padding line data) to the third color data DATA_S3, and the sub-pixel rendering block 142 may generate the third rendering data RDATA_S3 by applying the rendering filter to the third padding data PDATA_S3.

In this case, as shown in FIG. 17, each of the data values of the blue sub-pixel B positioned at the outermost edge of the display unit 110 may be dimmed. For example, the blue sub-pixel B positioned at the outermost edge of the display unit 110 may have the data value of 0.625 described with reference to FIGS. 15A and 15B. Meanwhile, the blue sub-pixel B positioned inside the display unit 110 except for the outermost edge may have a data value of 1.

The second padding block 1412 may generate the second padding data PDATA_S2 by adding the padding value (and the padding line data) described with reference to FIG. 14 to the second color data DATA_S2, and the sub-pixel rendering block 142 may generate the second rendering data RDATA_S2 by applying the rendering filter to the second padding data PDATA_S2. For example, the second padding block 1412 may add the padding line data of the (n+1)-th row ROWn+1 of FIG. 14 to the second color data DATA_S2. When the (2-1)-th rendering filter SPRF2-1 is applied to the second rendering data RDATA_S2, the current data value and a data value of subsequent line data may be substantially calculated, and thus the second rendering data RDATA_S2 may be generated.

That is, instead of bypassing the second color data DATA_S2 according to the embodiment of FIG. 12, the timing controller 140 may generate the second padding data PDATA_S2 by performing a padding processing also on the second color data DATA_S2 and may obtain the second rendering data RDATA_S2 by performing the sub-pixel rendering on the second padding data PDATA_S2 (in particular, by applying the same rendering filter to the first, second, and third padding data PDATA_S1, PDATA_S2, and PDATA_S3).

In this case, as shown in FIG. 17, each of the data values of the green sub-pixel G positioned at the outermost edge of the display unit 110 may be dimmed. For example, when the green sub-pixel G positioned inside the display unit 110 except for the outermost edge has a data value of 1, while undergoing a calculation process similar to that of the embodiment described with reference to FIGS. 15A and 15B, the green sub-pixel G positioned at the outermost edge of the display unit 110 may have a data value of 0.625.

As described above, all data values corresponding to the outermost edge of the display unit 110 may be changed (or dimmed) without a separate dimming circuit. For example, when the input image data DATA1 is a full-white image, a luminance of the outermost sub-pixels most adjacent to the edge of the display unit 110 may be different from a luminance of remaining sub-pixels except for the outermost sub-pixels among the sub-pixels, by the dimming process. Therefore, an unwanted line may be prevented from being visually recognized along the edge of the display unit 110.

Figure 18:
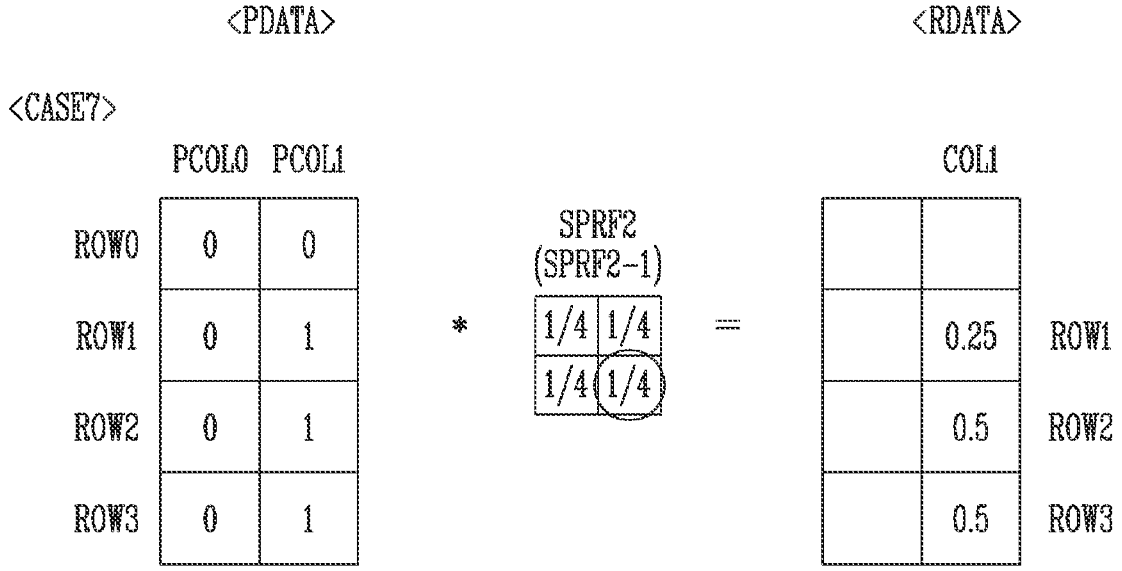
FIG. 18 is a diagram illustrating an operation of a timing controller according to a comparative embodiment.
Figure 19:
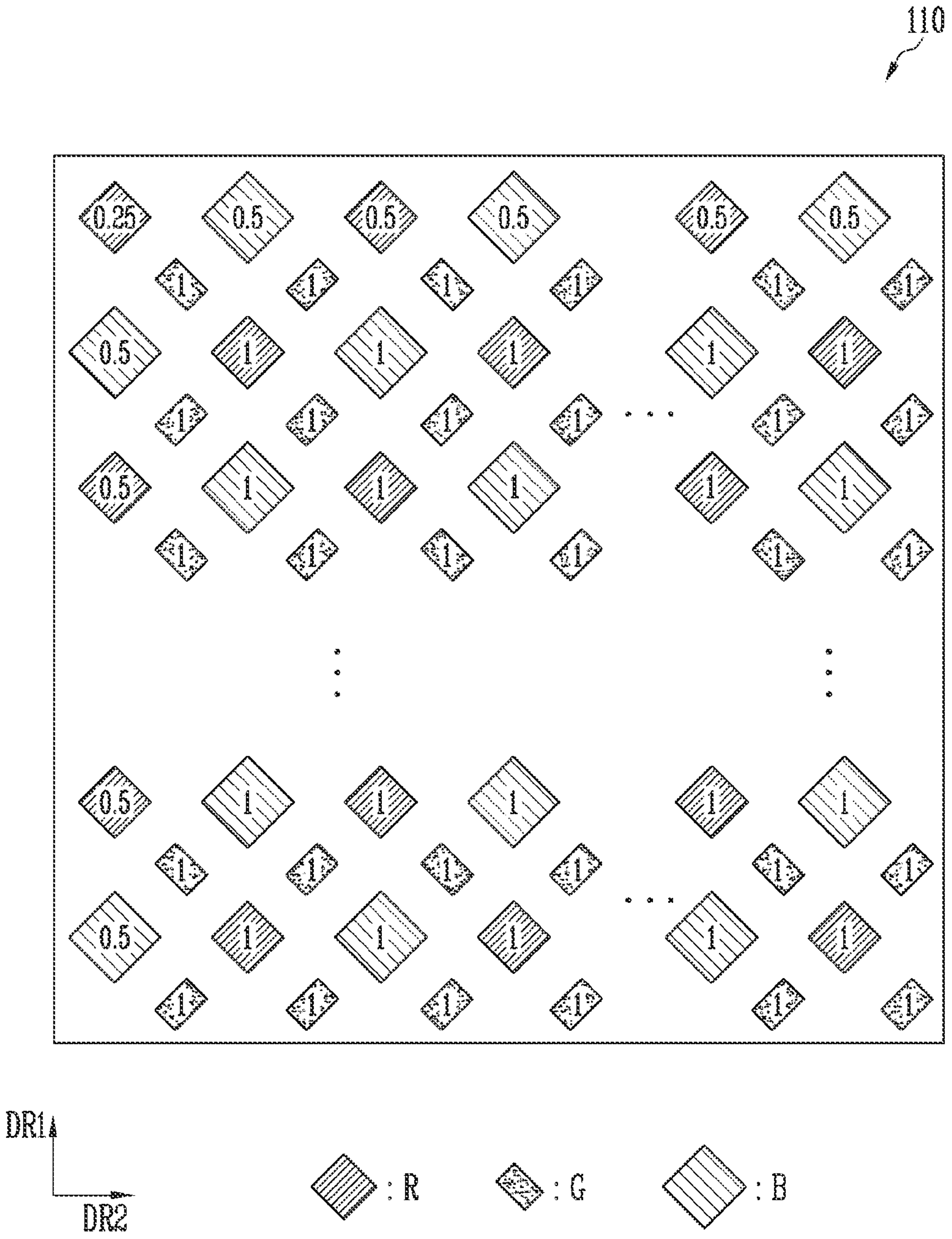
FIG. 19 is a diagram illustrating a display unit according to a comparative embodiment.

FIG. 18 is a diagram illustrating an operation of a timing controller according to a comparative embodiment. FIG. 19 is a diagram illustrating a display unit according to a comparative embodiment. FIG. 19 further shows data values according to the comparative embodiment of FIG. 18.

Referring to FIGS. 14 to 19, the embodiment of FIG. 18 may be similar to the embodiment of FIG. 15B except for an offset value. The display unit 110 of FIG. 19 may be similar to the display unit 110 of FIG. 17 except for some data values. Therefore, an overlapping description is not repeated.

In a seventh case CASE7 according to the comparative embodiment, the offset value may be 0. That is, differently from the first offset value VERTEX OFFSET and the second offset value EDGE OFFSET of FIGS. 15A and 15B, only one offset value may be set for all padding values (and padding line data) of the padding data PDATA of FIG. 14.

When the sub-pixel rendering block 142 (refer to FIG. 8) sequentially applies the (2-1)-th rendering filter SPRF2-1 to the padding data PDATA, based on the first column COL1 of the rendering data RDATA, the data value of the first row ROW1 may be calculated as 0.25 (that is, 0*1/4+0*1/4+0*1/4+1*1/4=0.25), and the data values of each of the second row ROW2 and the third row ROW3 may be calculated as 0.5 (that is, 0*1/4+1*1/4+0*1/4+1*1/4=0.5).

That is, the data value of the first row ROW1 and the first column COL1 of the rendering data RDATA may be calculated differently from remaining data values of the first column COL1 of the rendering data RDATA. In correspondence with this, as shown in FIG. 19, the data value (for example, 0.25) of the red sub-pixel R for the first row and the first column may be different from the data value (for example, 0.5) of the remaining red sub-pixel R positioned at the outermost edge of the display unit 110.

Therefore, as described with reference to FIGS. 15A and 15B, the first offset value VERTEX OFFSET for at least one padding value of the corner area A_V of FIG. 14 may be set differently from the second offset value EDGE OFFSET for the edge area A_E of FIG. 14.

FIGS. 20 to 23 are diagrams illustrating another example of the display unit included in the display device of FIG. 1.

Referring to FIGS. 1, 2, and 20 to 23, display units 110_1 to 110_4 of FIGS. 20 to 23 may be similar to the display unit 110 of FIG. 2 except for a pixel arrangement of the sub-pixels SPX1 to SPX4. Therefore, an overlapping description is not repeated.

Figure 20:
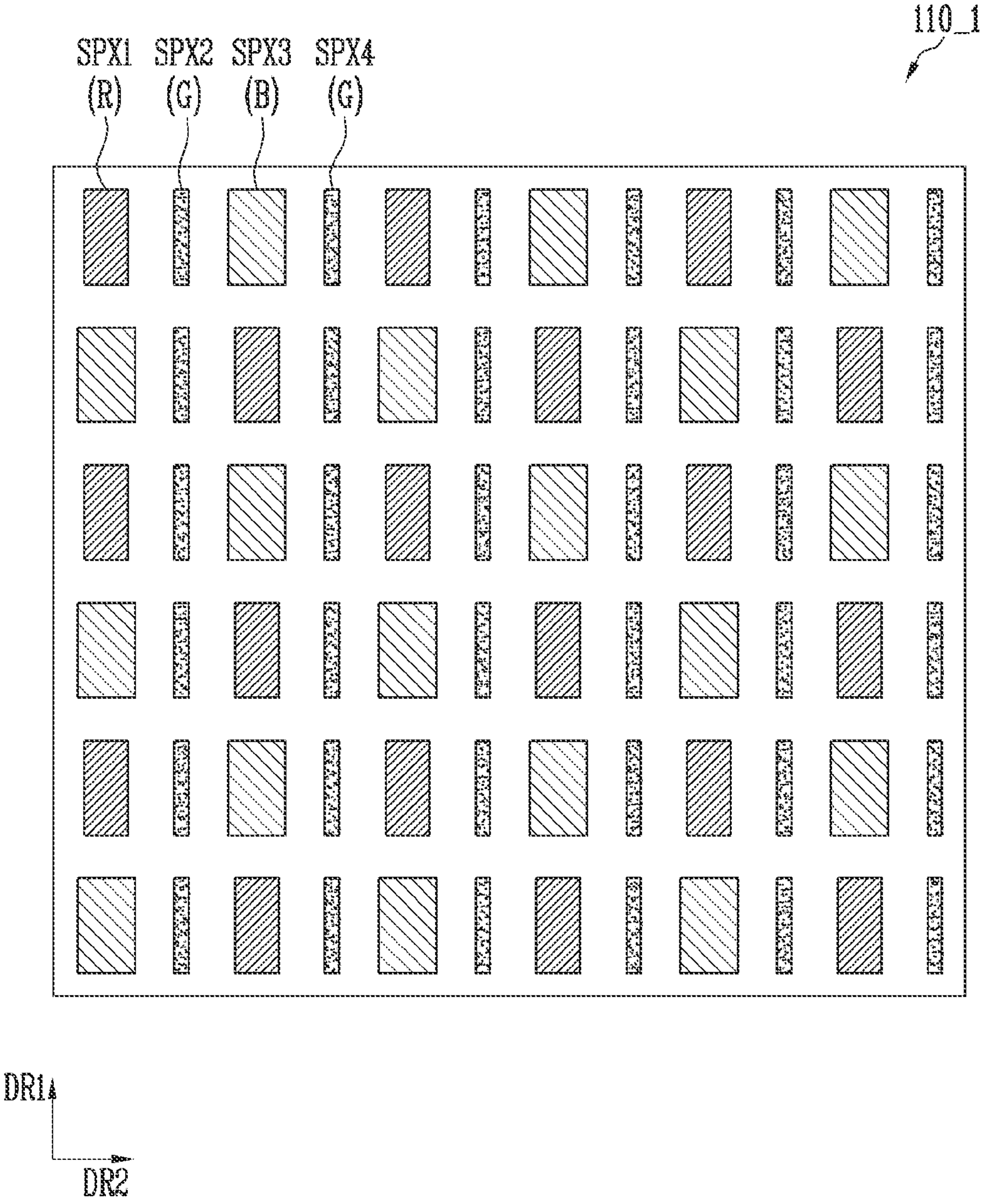
FIGS. 20 to 23 are diagrams illustrating another example of the display unit included in the display device of FIG. 1.

First, as shown in FIG. 20, the display unit 110_1 may include the sub-pixels SPX1 to SPX4 repeatedly arranged along the first direction DR1 and the second direction DR2.

Based on the red sub-pixel R of the first row and the first column, the blue sub-pixel B and the red sub-pixel R may be repeatedly arranged along the first direction DR1 and the second direction DR2, and the green sub-pixel G may be positioned between the red sub-pixel R and the blue sub-pixel B adjacent in the second direction DR2. That is, the display unit 110_1 may have a PENTILE™ pixel arrangement.

In this case, only the green sub-pixel G is disposed in a last column of the display unit 110_1, and a dimming process for the green sub-pixel G of the last column may be required. Therefore, the timing controller 140 (refer to FIGS. 8 and 16) may perform the padding operation and the sub-pixel rendering operation on the second color data for the green sub-pixel G. For example, the timing controller 140 may generate the second padding data by adding the padding values of the (m+1)-th pixel column PCOLm+1 described with reference to FIG. 9 to the second color data for the green sub-pixel G, and apply the rendering filter to the second padding data.

Meanwhile, the padding operation and the sub-pixel rendering operation may also be performed on the first color data for the red sub-pixel R and the third color data for the blue sub-pixel B.

Figure 21:
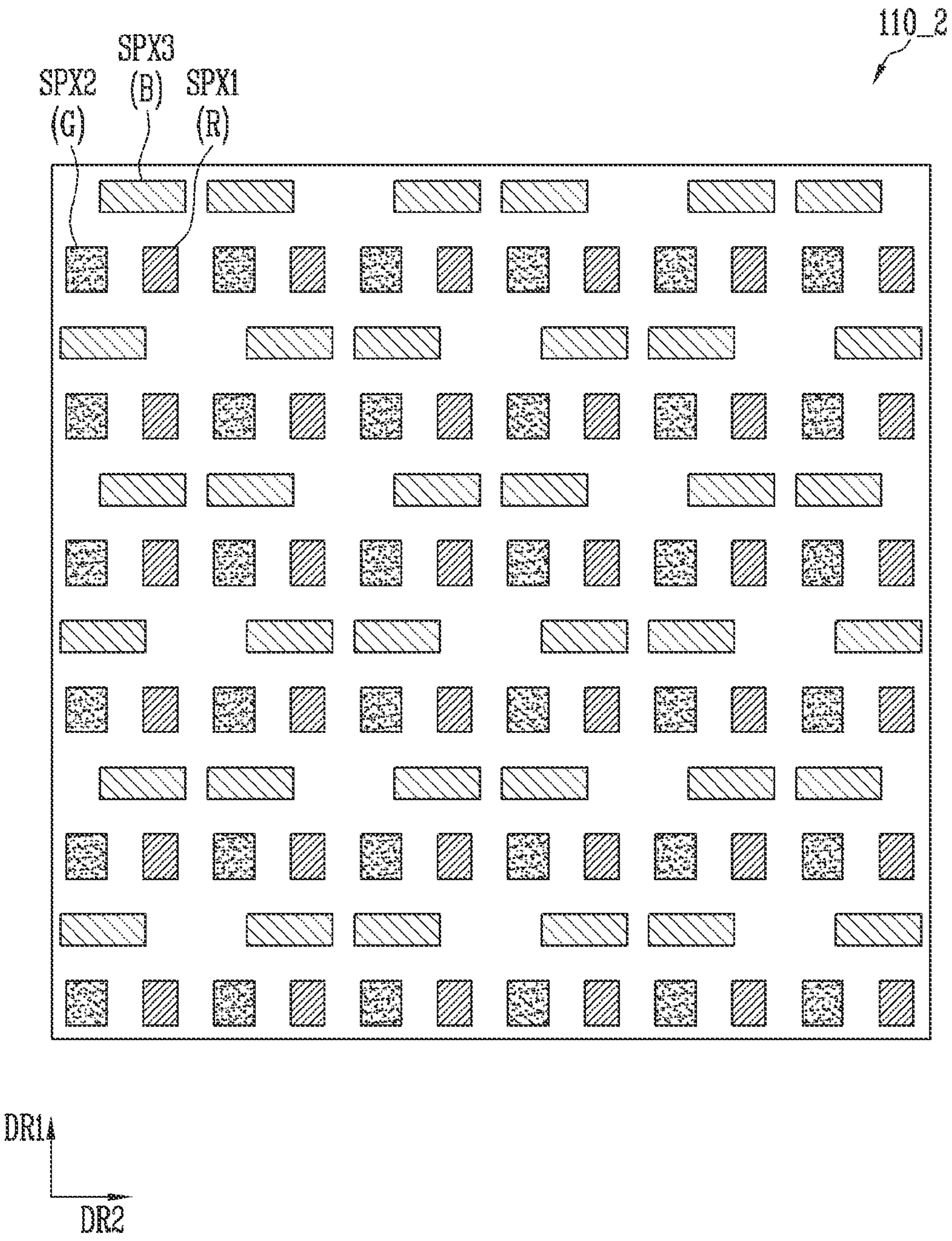

Referring to FIG. 21, the display unit 110_2 may include the second sub-pixel SPX2, the third sub-pixel SPX3, and the first sub-pixel SPX1 repeatedly arranged along the first direction DR1 and the second direction DR2.

Based on the second row, the green sub-pixel G and the red sub-pixel R may be repeatedly disposed along the second direction DR2, and each of the green sub-pixel G and the red sub-pixel R may be arranged along the first direction DR1. The blue sub-pixel B may be disposed between the green sub-pixel G and the red sub-pixel R adjacent in the first direction DR1, and may be arranged along the second direction DR2. That is, the display unit 110_2 may have a pixel arrangement called “S-stripe”.

In this case, only the blue sub-pixel B is disposed in a first row of the display unit 110_2, and the dimming process for the blue sub-pixel B of the first row may be required. Therefore, the timing controller 140 (refer to FIGS. 8 and 16) may perform the padding operation and the sub-pixel rendering operation on the third color data for the blue sub-pixel B. For example, the timing controller 140 may generate the third padding data by adding the padding values (or the padding line data) of the 0-th row ROW0 described with reference to FIG. 14 to the third color data for the blue sub-pixel B, and apply the rendering filter to the third padding data.

Meanwhile, for the dimming process for each of the second color data for the green sub-pixel G and the first color data for the red sub-pixel R, the padding operation and the sub-pixel rendering operation may also be performed on each of the third color data and the first color data.

Figure 22:
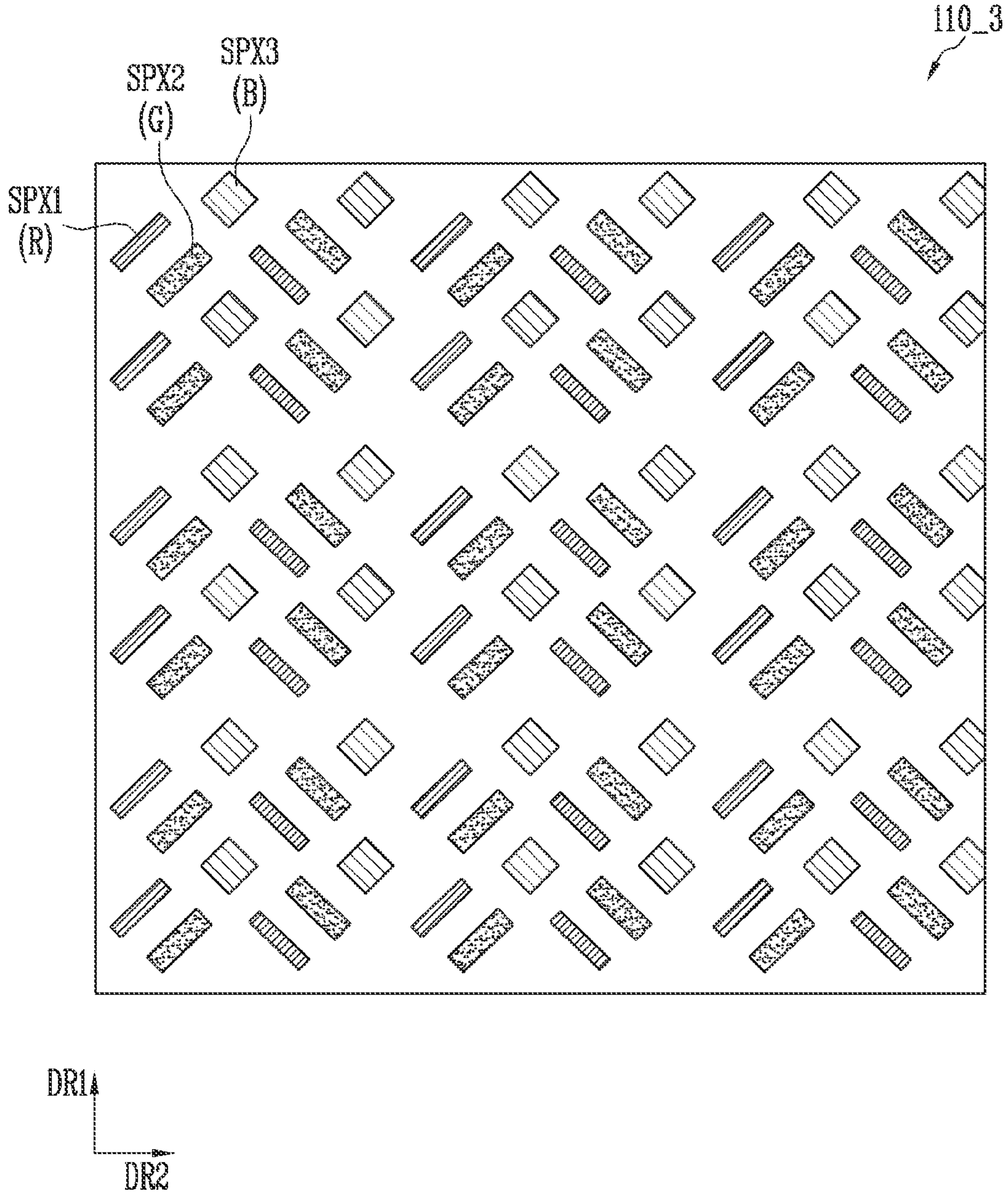

Referring to FIG. 22, the display unit 110_3 may include the first sub-pixel SPX1, the second sub-pixel SPX2, and the third sub-pixel SPX3 repeatedly arranged along the first direction DR1 and the second direction DR2.

Based on the red sub-pixel R of the first row and the first column, the green sub-pixel G may be positioned in a diagonal direction, and the red sub-pixel R and the green sub-pixel G may be repeatedly arranged along the first direction DR1. The blue sub-pixel B may be disposed between the diagonally adjacent green sub-pixel G and red sub-pixel R, and may be arranged along the first direction DR1 and the second direction DR2. That is, the display unit 110_3 may have a pixel arrangement called “H-stripe”.

In this case, only the blue sub-pixel B is disposed in the first row and a last column of the display unit 110_2, and a dimming process for the blue sub-pixel B of the first row and the last column may be required. Therefore, the timing controller 140 (refer to FIGS. 8 and 16) may perform the padding operation and the sub-pixel rendering operation on the third color data for the blue sub-pixel B. For example, the timing controller 140 may generate the third padding data by adding the padding values (or the padding line data) of the 0-th row ROW0 described with reference to FIG. 14 and the padding values of the (m+1)-th pixel column PCOLm+1 to the third color data for the blue sub-pixel B, and apply the rendering filter to the third padding data.

In addition, only the red sub-pixel R is disposed in a first column of the display unit 110_2, and the dimming process for the red sub-pixel R of the first column may be required. Therefore, the timing controller 140 may perform the padding operation and the sub-pixel rendering operation on the first color data for the red sub-pixel R. For example, the timing controller 140 may generate the first padding data by adding the padding values of the 0-th pixel column PCOL0 described with reference to FIG. 14 to the first color data for the red sub-pixel R, applying the rendering filter to the first padding data.

Meanwhile, the padding operation and the sub-pixel rendering operation may also be performed on the second color data for the green sub-pixel G.

Figure 23:
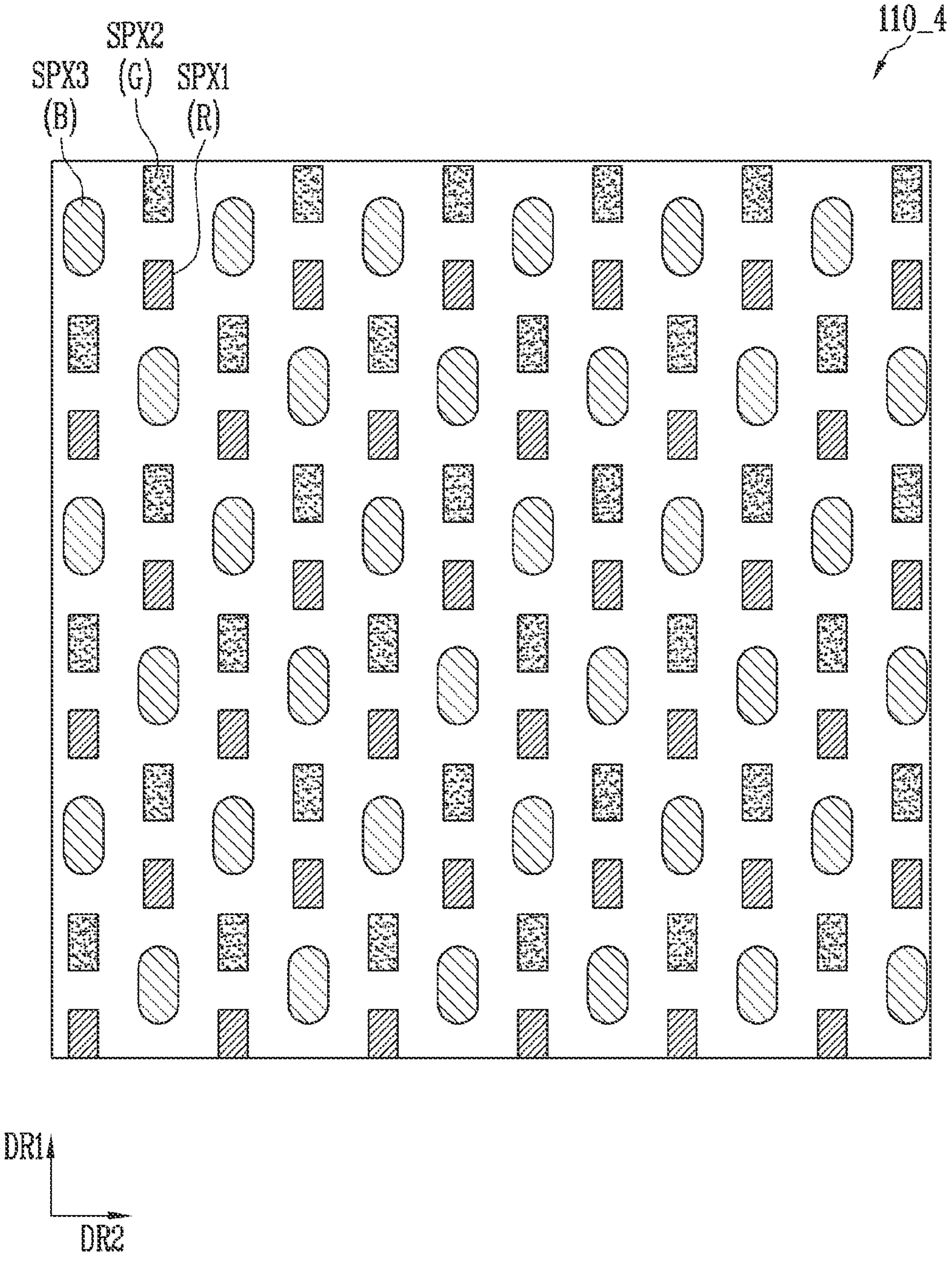

Referring to FIG. 23, the display unit 110_4 may include the first sub-pixel SPX1, the second sub-pixel SPX2, and the third sub-pixel SPX3 repeatedly arranged along the first direction DR1 and the second direction DR2.

Based on an odd-numbered column, the blue sub-pixel B, the green sub-pixel G, and the red sub-pixel R may be repeatedly arranged along the first direction DR1. Based on an even-numbered column, the green sub-pixel G, the red sub-pixel R, and the blue sub-pixel B may be repeatedly arranged along the first direction DR1. Each of the blue sub-pixel B, the green sub-pixel G, and the red sub-pixel R may be disposed along a grid arrangement. That is, the display unit 110_4 may have a pixel arrangement called “Delta”.

In this case, only the green sub-pixel G is disposed in a first row of the display unit 110_4, and only the red sub-pixel R is disposed in a last row of the display unit 110_4. Therefore, the timing controller 140 (refer to FIGS. 8 and 16) may perform the padding operation and the sub-pixel rendering operation on each of the second color data for the green sub-pixel G and the first color data for the red sub-pixel R. For example, the timing controller 140 may generate the second padding data by adding the padding values (or the padding line data) of the 0-th row ROW0 described with reference to FIG. 14 to the second color data for the green sub-pixel G, and apply the rendering filter to the second padding data. Similarly, the timing controller 140 may generate the first padding data by adding the padding values (or the padding line data) of the (n+1)-th row ROWn+1 described with reference to FIG. 14 to the first color data for the red sub-pixel R, and applying the rendering filter to the first padding data.

Meanwhile, the padding operation and the sub-pixel rendering operation may also be performed on the third color data for the blue sub-pixel B.

As described above, the dimming operation and the sub-pixel rendering operation of the timing controller 140 may be applied to the display units 110_1 to 110_4 having various pixel arrangements. The rendering data that has been substantially dimmed may be obtained through the dimming operation and the sub-pixel rendering operation of the timing controller 140.

Figure 24:
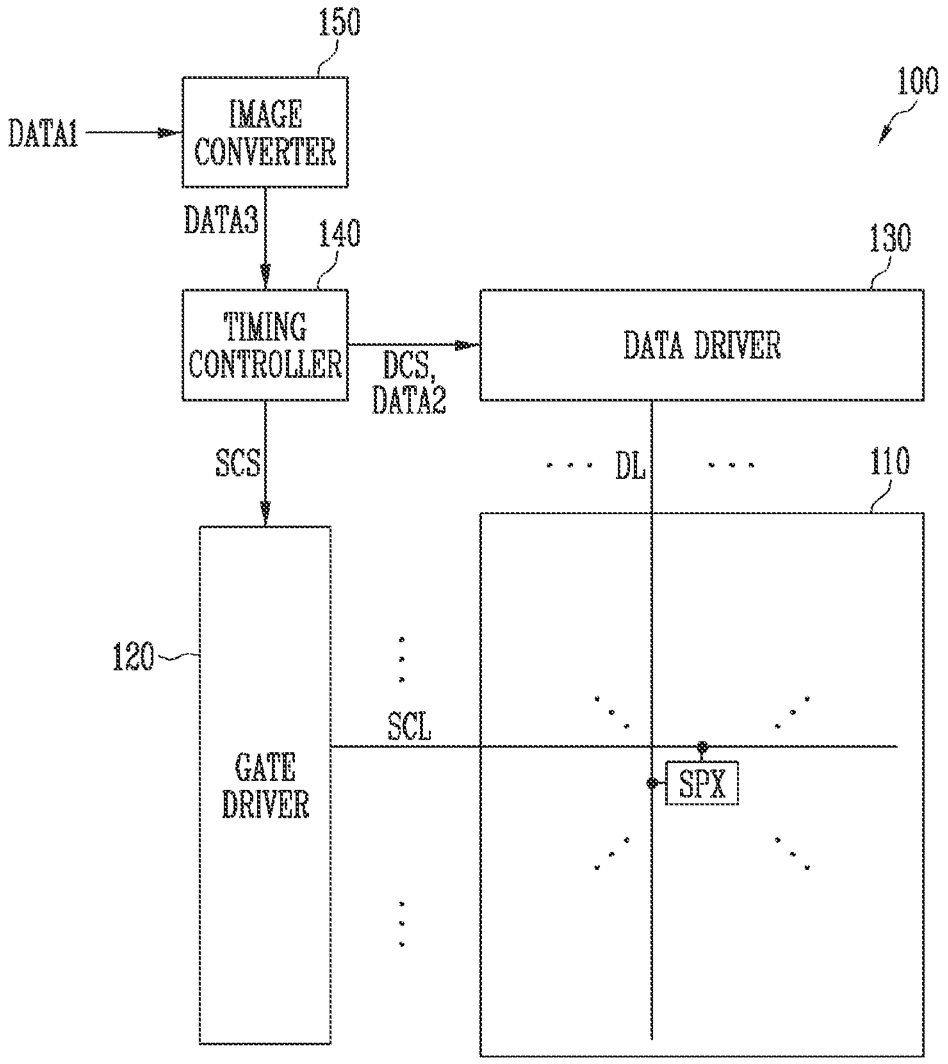
FIGS. 24 and 25 are diagrams illustrating an embodiment of the display device of FIG. 1.
Figure 25:
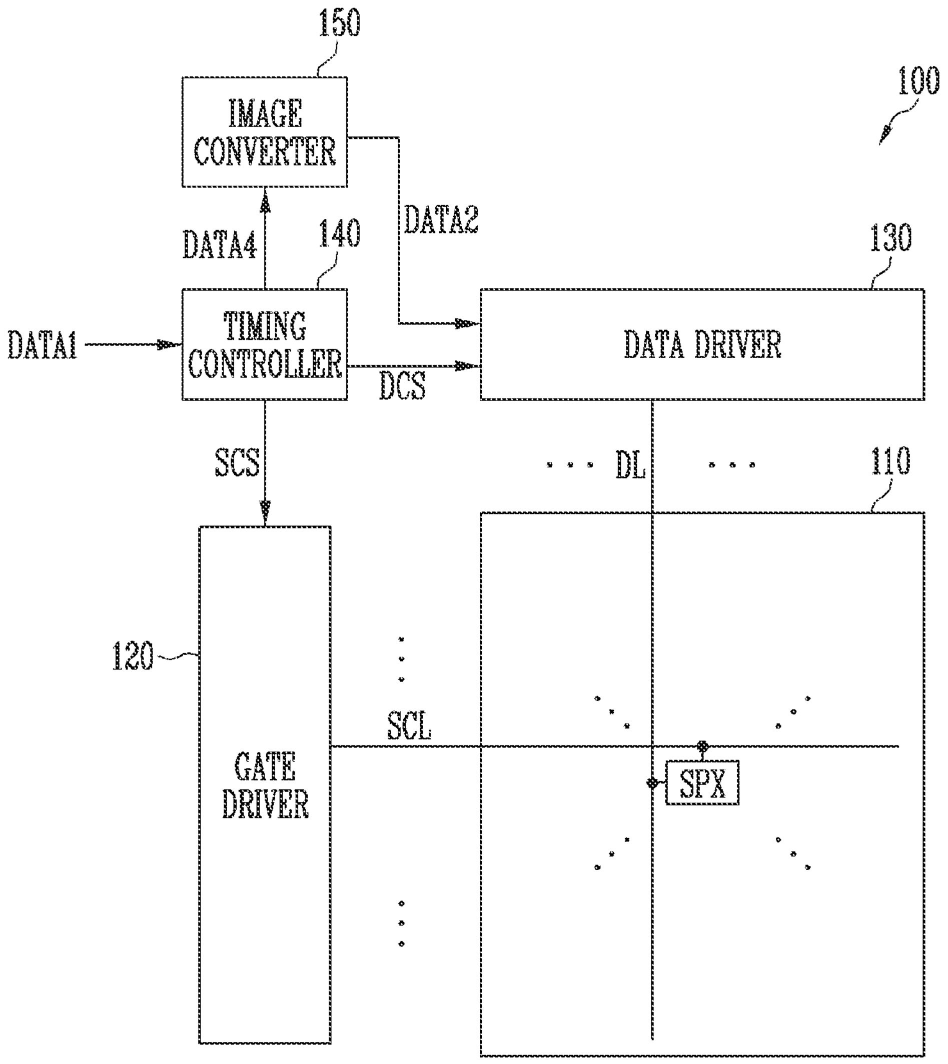

FIGS. 24 and 25 are diagrams illustrating an embodiment of the display device of FIG. 1.

In the above-described embodiments, although it has been described that the timing controller 140 of FIG. 1 performs the padding operation (for example, an operation of the padding block 141 of FIG. 8), the sub-pixel rendering operation (for example, an operation of the sub-pixel rendering block 142 of FIG. 8), and the dimming operation (for example, an operation of the dimming block 143 of FIG. 13), the disclosure is not limited thereto.

Referring to FIGS. 1, 24, and 25, the display device 100 may further include an image converter 150 (or an image conversion circuit) that performs at least one of the padding operation, the sub-pixel rendering operation, and the dimming operation described with reference to the above-described embodiments.

The image converter 150 may be implemented as a processor or an integrated circuit independent from the timing controller 140, or may be implemented as one functional block of the timing controller 140 and another configuration.

In an embodiment, as shown in FIG. 24, the image converter 150 may be disposed at a front end of the timing controller 140, and may generate third data DATA3 by performing at least one of the padding operation, the sub-pixel rendering operation, and the dimming operation on the input image data DATA1. In this case, the timing controller 140 may generate the image data DATA2 by performing a remaining operation on the third data DATA3 or performing a compensation operation such as a deterioration compensation operation. Here, the remaining operation may be an operation which is not performed by the image converter 150 during the padding operation, the sub-pixel rendering operation, and the dimming operation. For example, when the image converter 150 performs the padding operation, the timing controller 140 may perform the sub-pixel rendering operation as the remaining operation.

For example, the image converter 150 of FIG. 24 may be implemented as an application processor (AP), a mobile AP, a central processing unit (CPU), a graphic processing unit (GPU), or a processor capable of controlling an operation of the display device 100, or may be implemented as one functional block of the processor, but is not limited thereto.

In an embodiment, as shown in FIG. 25, the image converter 150 may be disposed at a rear end of the timing controller 140, and may generate the image data DATA2 by performing at least one of the padding operation, the sub-pixel rendering operation, and the dimming operation on fourth data DATA4. Here, the fourth data DATA4 may be generated from the input image data DATA1 by performing the remaining operation or the compensation operation (for example, the deterioration compensation operation) by the timing controller 140.

For example, the image converter 150 of FIG. 25 may be implemented as one functional block of the data driver 130, but is not limited thereto.

Figure 26:
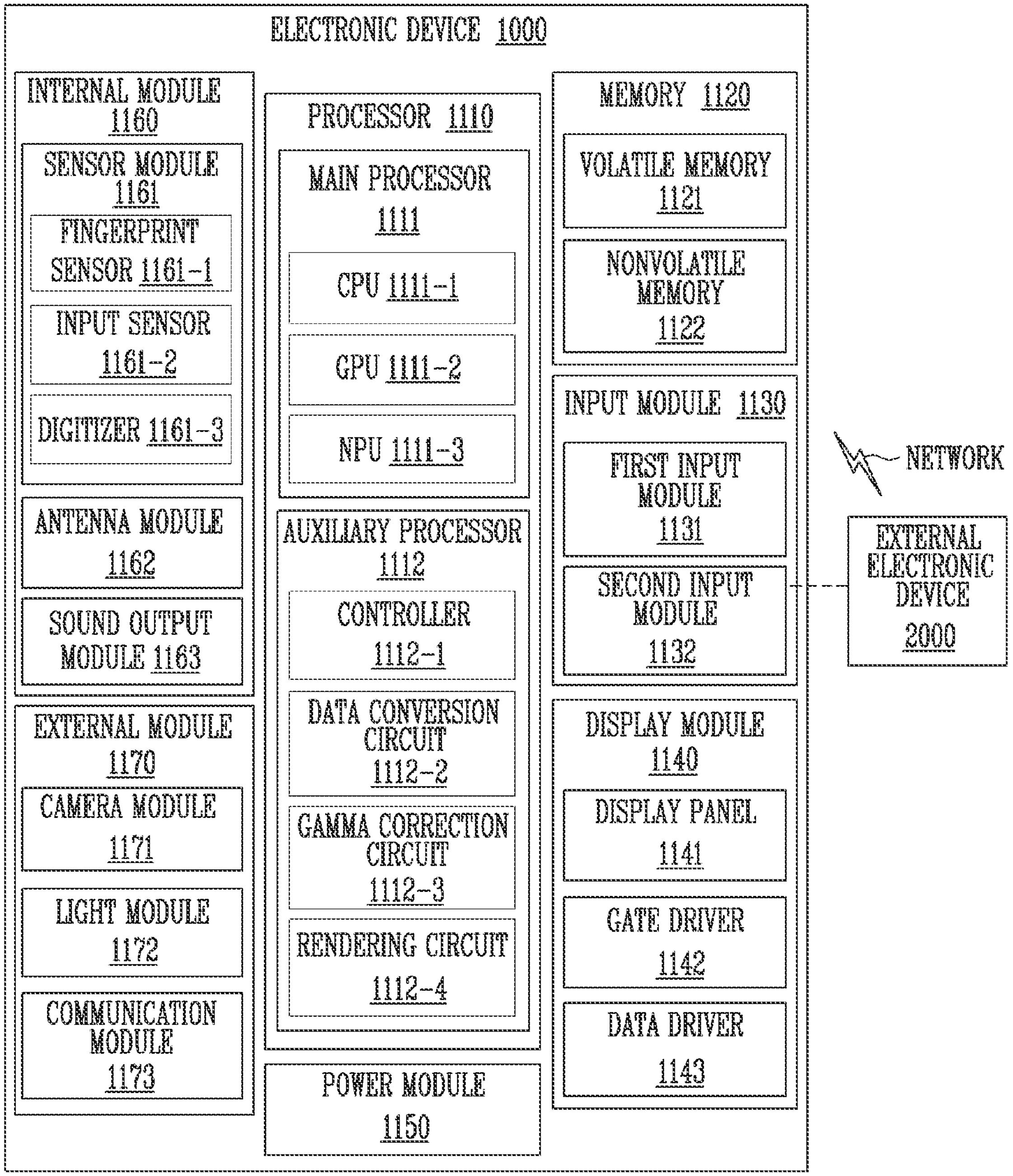
FIG. 26 is a diagram illustrating an electronic device to which a display device according to an embodiment of the disclosure is applied.

As described above, the padding operation, the sub-pixel rendering operation, and the dimming operation described with reference to FIGS. 1 to 24 are not limited to being performed by the timing controller 140, and the operations may be performed by an independent processor, or the operations may be performed by at least one of configurations (for example, an external processor, the timing controller 140, and the data driver 130) on a data transmission path. FIG. 26 is a diagram illustrating an electronic device to which a display device according to an embodiment of the disclosure is applied.

The electronic device 1000 may output various pieces of information through a display module 1140 within an operating system. The display module 1140 may correspond to at least a portion of the display device 100 of FIG. 1. When a processor 1110 executes an application stored in a memory 1120, the display module 1140 may provide application information to a user through a display panel 1141.

The processor 1110 may obtain an external input through an input module 1130 or a sensor module 1161 and execute an application corresponding to the external input. For example, when the user selects a camera icon displayed on the display panel 1141, the processor 1110 may obtain a user input through an input sensor 1161-2 and activate a camera module 1171. The processor 1110 may transmit image data corresponding to a captured image obtained through the camera module 1171 to the display module 1140. The display module 1140 may display an image corresponding to the captured image through the display panel 1141.

As another example, when personal information authentication is executed in the display module 1140, a fingerprint sensor 1161-1 may obtain input fingerprint information as input data. The processor 1110 may compare input data obtained through the fingerprint sensor 1161-1 with authentication data stored in a memory 1120 and execute an application according to a comparison result. The display module 1140 may display information executed according to a logic of the application through the display panel 1141.

As still another example, when a music streaming icon displayed on the display module 1140 is selected, the processor 1110 may obtain a user input through the input sensor 1161-2 and activate a music streaming application stored in the memory 1120. When a music execution command is input in the music streaming application, the processor 1110 may activate a sound output module 1163 to provide sound information corresponding to the music execution command to the user.

In the above, an operation of the electronic device 1000 is briefly described. Hereinafter, a configuration of the electronic device 1000 is described in detail. Some of configurations of the electronic device 1000 to be described later may be integrated and provided as one configuration, and one configuration may be separated into two or more configurations and provided.

Referring to FIG. 26, the electronic device 1000 may communicate with an external electronic device 2000 through a network (for example, a short-range wireless communication network or a long-range wireless communication network). According to an embodiment, the electronic device 1000 may include a processor 1110, a memory 1120, an input module 1130, a display module 1140, a power module 1150, an internal module 1160, and an external module 1170. According to an embodiment, in the electronic device 1000, at least one of the above-described components may be omitted or one or more other components may be added. According to an embodiment, some of the above-described components (for example, the sensor module 1161, an antenna module 1162, or the sound output module 1163) may be integrated into another component (for example, the display module 1140).

The processor 1110 may execute software to control at least another component (for example, a hardware or software component) of the electronic device 1000 connected to the processor 1110, and perform various data processing or operations. According to an embodiment, as at least a portion of the data processing or operation, the processor 1110 may store a command or data received from another component (for example, the input module 1130, the sensor module 1161, or a communication module 1173) in a volatile memory 1121 and process the command or the data stored in the volatile memory 1121, and result data may be stored in a nonvolatile memory 1122.

The processor 1110 may include a main processor 1111 and an auxiliary processor 1112. The image converter of FIGS. 24 and 25 may correspond to the main processor 1111 or the auxiliary processor 1112, or may be one function block thereof.

The main processor 1111 may include one or more of a central processing unit (CPU) 1111-1 or an application processor (AP). The main processor 1111 may further include any one or more of a graphic processing unit (GPU) 1111-2, a communication processor (CP), and an image signal processor (ISP). The main processor 1111 may further include a neural processing unit (NPU) 1111-3. The NPU is a processor specialized in processing an artificial intelligence model, and the artificial intelligence model may be generated through machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network, or a combination of two or more of the above, but is not limited to the above-described example. Additionally or alternatively, the artificial intelligence model may include a software structure in addition to a hardware structure. At least two of the above-described processing units and processors may be implemented as one integrated configuration (for example, a single chip), or each may be implemented as an independent configuration (for example, a plurality of chips).

The auxiliary processor 1112 may include a controller 1112-1. The controller 1112-1 may include an interface conversion circuit and a timing control circuit. The controller 1112-1 may receive an image signal from the main processor 1111, convert a data format of the image signal to correspond to an interface specification with the display module 1140, and output image data. The controller 1112-1 may output various control signals necessary for driving the display module 1140.

The auxiliary processor 1112 may further include a data conversion circuit 1112-2, a gamma correction circuit 1112-3, a rendering circuit 1112-4, and the like. The data conversion circuit 1112-2 may receive the image data from the controller 1112-1, compensate the image data to display an image with a desired luminance according to a characteristic of the electronic device 1000, a setting of the user, or the like, or convert the image data for reduction of power consumption, afterimage compensation, or the like. The gamma correction circuit 1112-3 may convert the image data, a gamma reference voltage, or the like so that the image displayed on the electronic device 1000 has a desired gamma characteristic. The rendering circuit 1112-4 may receive the image data from the controller 1112-1 and render the image data in consideration of a pixel disposition or the like of the display panel 1141 applied to the electronic device 1000. At least one of the data conversion circuit 1112-2, the gamma correction circuit 1112-3, and the rendering circuit 1112-4 may be integrated into another component (for example, the main processor 1111 or the controller 1112-1). At least one of the data conversion circuit 1112-2, the gamma correction circuit 1112-3, and the rendering circuit 1112-4 may be integrated into a data driver 1143 to be described later.

The memory 1120 may store various data used by at least one component (for example, the processor 1110 or the sensor module 1161) of the electronic device 1000, and input data or output data for a command related thereto. The memory 1120 may include at least one of the volatile memory 1121 and the nonvolatile memory 1122.

The input module 1130 may receive a command or data to be used by a component (for example, the processor 1110, the sensor module 1161, or the sound output module 1163) of the electronic device 1000 from an outside (for example, the user or the external electronic device 2000) of the electronic device 1000.

The input module 1130 may include a first input module 1131 to which a command or data is input from the user and a second input module 1132 to which a command or data is input from the external electronic device 2000. The first input module 1131 may include a microphone, a mouse, a keyboard, a key (for example, a button), or a pen (for example, a passive pen or an active pen). The second input module 1132 may support a designated protocol capable of connecting to the external electronic device 2000 by wire or wirelessly. According to an embodiment, the second input module 1132 may include a high definition multimedia interface (HDMI), a universal serial bus (USB) interface, an SD card interface, or an audio interface. The second input module 1132 may include a connector capable of physically connecting to the external electronic device 2000, for example, an HDMI connector, a USB connector, an SD card connector, or an audio connector (for example, a headphone connector).

The display module 1140 may visually provide information to the user. The display module 1140 may include a display panel 1141, a gate driver 1142, and a data driver 1143. The gate driver 1142 and the data driver 1143 may correspond to the gate driver 120 and the data driver 130 of FIG. 1, respectively. The display module 1140 may further include a window, a chassis, and a bracket for protecting the display panel 1141.

The display panel 1141 may include a liquid crystal display panel, an organic light emitting display panel, or an inorganic light emitting display panel, and a type of the display panel 1141 is not particularly limited. The display panel 1141 may be a rigid type or a flexible type that may be rolled or folded. The display module 1140 may further include a supporter, a bracket, a heat dissipation member, or the like that supports the display panel 1141.

The gate driver 1142 may be mounted on the display panel 1141 as a driving chip. In addition, the gate driver 1142 may be integrated in the display panel 1141. For example, the gate driver 1142 may include an amorphous silicon TFT gate driver circuit (ASG), a low temperature polycrystaline silicon (LTPS) TFT gate driver circuit, or an oxide semiconductor TFT gate driver circuit (OSG) built in the display panel 1141. The gate driver 1142 may receive a control signal from the controller 1112-1 and output scan signals to the display panel 1141 in response to the control signal.

The display panel 1141 may further include an emission driver. The emission driver may output an emission control signal to the display panel 1141 in response to a control signal received from the controller 1112-1. The emission driver may be formed separately from the gate driver 1142 or may be integrated into the gate driver 1142.

The data driver 1143 may receive a control signal from the controller 1112-1, convert image data into an analog voltage (for example, a data voltage) in response to the control signal, and then output the data voltages to the display panel 1141.

The data driver 1143 may be integrated into another component (for example, the controller 1112-1). A function of the interface conversion circuit and the timing control circuit of the controller 1112-1 described above may be integrated into the data driver 1143.

The display module 1140 may further include an emission driver, a voltage generation circuit, and the like. The voltage generation circuit may output various voltages necessary for driving the display panel 1141.

The power module 1150 may supply power to a component of the electronic device 1000. The power module 1150 may include a battery that charges a power voltage. The battery may include a non-rechargeable primary cell, and a rechargeable secondary cell or fuel cell. The power module 1150 may include a power management integrated circuit (PMIC). The PMIC may supply optimized power to each of the above-described module and a module to be described later. The power module 1150 may include a wireless power transmission/reception member electrically connected to the battery. The wireless power transmission/reception member may include a plurality of antenna radiators of a coil form.

The electronic device 1000 may further include the internal module 1160 and the external module 1170. The internal module 1160 may include the sensor module 1161, the antenna module 1162, and the sound output module 1163. The external module 1170 may include the camera module 1171, a light module 1172, and the communication module 1173.

The sensor module 1161 may sense an input by a body of the user or an input by a pen among the first input module 1131, and may generate an electrical signal or a data value corresponding to the input. The sensor module 1161 may include at least one of a fingerprint sensor 1161-1, an input sensor 1161-2, and a digitizer 1161-3.

The fingerprint sensor 1161-1 may generate a data value corresponding to a fingerprint of the user. The fingerprint sensor 1161-1 may include any one of an optical type fingerprint sensor or a capacitive type fingerprint sensor.

The input sensor 1161-2 may generate a data value corresponding to coordinate information of the input by the body of the user or the pen. The input sensor 1161-2 may generate a capacitance change amount by the input as the data value. The input sensor 1161-2 may sense an input by the passive pen or may transmit/receive data to and from the active pen.

The input sensor 1161-2 may measure a biometric signal such as blood pressure, water, or body fat. For example, when the user touches a sensor layer or a sensing panel with a body part and does not move during a certain time, the input sensor 1161-2 may sense the biometric signal based on a change of an electric field by the body part and output information desired by the user to the display module 1140.

The digitizer 1161-3 may generate a data value corresponding to coordinate information of the input by the pen. The digitizer 1161-3 may generate an electromagnetic change amount by the input as the data value. The digitizer 1161-3 may sense the input by the passive pen or may transmit/receive data to and from the active pen.

At least one of the fingerprint sensor 1161-1, the input sensor 1161-2, and the digitizer 1161-3 may be implemented as the sensor layer formed on the display panel 1141 through a continuous process. The fingerprint sensor 1161-1, the input sensor 1161-2, and the digitizer 1161-3 may be disposed above the display panel 1141, and any one of the fingerprint sensor 1161-1, the input sensor 1161-2, and the digitizer 1161-3, for example, the digitizer 1161-3 may be disposed below the display panel 1141.

At least two of the fingerprint sensor 1161-1, the input sensor 1161-2, and the digitizer 1161-3 may be formed to be integrated into one sensing panel through the same process. When at least two of the fingerprint sensor 1161-1, the input sensor 1161-2, and the digitizer 1161-3 are integrated into one sensing panel, the sensing panel may be disposed between the display panel 1141 and a window disposed above the display panel 1141. According to an embodiment, the sensing panel may be disposed on the window, and a position of the sensing panel is not particularly limited.

At least one of the fingerprint sensor 1161-1, the input sensor 1161-2, and the digitizer 1161-3 may be embedded in the display panel 1141. That is, at least one of the fingerprint sensor 1161-1, the input sensor 1161-2, and the digitizer 1161-3 may be simultaneously formed through a process of forming elements (for example, a light emitting element, a transistor, and the like) included in the display panel 1141.

In addition, the sensor module 1161 may generate an electrical signal or a data value corresponding to an internal state or an external state of the electronic device 1000. The sensor module 1161 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 1162 may include one or more antennas for transmitting a signal or power to an outside or receiving a signal or power from an outside. According to an embodiment, the communication module 1173 may transmit a signal to an external electronic device or receive a signal from an external electronic device through an antenna suitable for a communication method. An antenna pattern of the antenna module 1162 may be integrated into one configuration (for example, the display panel 1141) of the display module 1140 or the input sensor 1161-2.

The sound output module 1163 is a device for outputting a sound signal to an outside of the electronic device 1000, and may include, for example, a speaker used for general purposes such as multimedia playback or recording playback, and a receiver used exclusively for receiving a call. According to an embodiment, the receiver may be formed integrally with or separately from the speaker. A sound output pattern of the sound output module 1163 may be integrated into the display module 1140.

The camera module 1171 may capture a still image and a moving image. According to an embodiment, the camera module 1171 may include one or more lenses, an image sensor, or an image signal processor. The camera module 1171 may further include an infrared camera capable of measuring presence or absence of the user, a position of the user, a gaze of the user, and the like.

The light module 1172 may provide light. The light module 1172 may include a light emitting diode or a xenon lamp. The light module 1172 may operate in conjunction with the camera module 1171 or may operate independently.

The communication module 1173 may support establishment of a wired or wireless communication channel between the electronic device 1000 and the external electronic device 2000 and communication performance through the established communication channel. The communication module 1173 may include any one or both of a wireless communication module such as a cellular communication module, a short-range wireless communication module, or a global navigation satellite system (GNSS) communication module, and a wired communication module such as a local area network (LAN) communication module or a power line communication module. The communication module 1173 may communicate with the external electronic device 2000 through a short-range communication network such as Bluetooth, WiFi direct, or infrared data association (IrDA), or a long-range communication network such as a cellular network, the Internet, or a computer network (for example, LAN or WAN). The above-described various types of communication modules 1173 may be implemented as a single chip or as separate chips.

The input module 1130, the sensor module 1161, the camera module 1171, and the like may be used to control an operation of the display module 1140 in conjunction with the processor 1110.

The processor 1110 may output a command or data to the display module 1140, the sound output module 1163, the camera module 1171, or the light module 1172 based on input data received from the input module 1130. For example, the processor 1110 may generate image data in response to the input data applied through a mouse, an active pen, or the like and output the image data to the display module 1140, or generate command data in response to the input data and output the command data to the camera module 1171 or the light module 1172. When the input data is not received from the input module 1130 during a certain time, the processor 1110 may convert an operation mode of the electronic device 1000 to a low power mode or a sleep mode to reduce power consumed in the electronic device 1000.

The processor 1110 may output a command or data to the display module 1140, the sound output module 1163, the camera module 1171, or the light module 1172 based on sensing data received from the sensor module 1161. For example, the processor 1110 may compare authentication data applied by the fingerprint sensor 1161-1 with authentication data stored in the memory 1120 and then execute an application according to a comparison result. The processor 1110 may execute the command based on sensing data sensed by the input sensor 1161-2 or the digitizer 1161-3 or output corresponding image data to the display module 1140. When the sensor module 1161 includes a temperature sensor, the processor 1110 may receive temperature data for a measured temperature from the sensor module 1161 and further perform luminance correction or the like on the image data based on the temperature data.

The processor 1110 may receive measurement data for the presence of the user, the position of the user, the gaze of the user, and the like, from the camera module 1171. The processor 1110 may further perform luminance correction or the like on the image data based on the measurement data. For example, the processor 1110 determining the presence or absence of the user through an input from the camera module 1171 may output image data of which a luminance is corrected through the data conversion circuit 1112-2 or the gamma correction circuit 1112-3 to the display module 1140.

Some of the above-described components may be connected to each other through a communication method between peripheral devices, for example, a bus, general purpose input/output (GPIO), a serial peripheral interface (SPI), a mobile industry processor interface (MIPI), or an ultra path interconnect (UPI) link to exchange a signal (for example, a command or data) with each other. The processor 1110 may communicate with the display module 1140 through a mutually agreed interface, for example, may use any one of the above-described communication methods, and is not limited to the above-described communication method.

The electronic device 1000 according to various embodiments disclosed in the present document may be various types of devices. The electronic device 1000 may include, for example, at least one of a portable communication device (for example, a smartphone), a computer device, a portable multimedia device, a portable medical device, a camera, a wearable device, and a home appliance device. The electronic device 1000 according to an embodiment of the present document is not limited to the above-described devices.

Although the technical spirit of the disclosure has been described in detail in accordance with the above-described embodiments, it should be noted that the above-described embodiments are for the purpose of description and not of limitation. In addition, those skilled in the art may understand that various modifications are possible within the scope of the technical spirit of the disclosure.

The scope of the disclosure is not limited to the details described in the detailed description of the specification. In addition, it is to be construed that all changes or modifications derived from the meaning and scope of the claims and equivalent concepts thereof are included in the scope of the disclosure.

What is claimed is:

1. A display device comprising:

a display panel including pixels and each the pixels including sub-pixels; and a driver configured to convert first frame data corresponding to a first pixel arrangement of the sub-pixels into second frame data corresponding to a second pixel arrangement, and provide data signals corresponding to the second frame data to the sub-pixels having the second pixel arrangement, wherein the driver comprises:

a padding circuit configured to convert the first frame data into padding data by adding a first padding value to at least one of a front end and a rear end of each line data of the first frame data; and a rendering circuit configured to generate the second frame data by applying a rendering filter to the padding data.

2. The display device according to claim 1, wherein a number of the sub-pixels of a first one of the pixels having the second pixel arrangement is different from a number of the sub-pixels of a second one of the pixels having the first pixel arrangement.

3. The display device according to claim 1, wherein the padding circuit adds the first padding value to the front end of the line data, and wherein the rendering circuit applies the rendering filter of one-dimension to a previous data value and a current data value in the line data.

4. The display device according to claim 3, wherein the first padding value is 0 or corresponds to a grayscale of 0.

5. The display device according to claim 3, wherein the padding circuit calculates the first padding value by multiplying a first data value of the line data by an offset value.

6. The display device according to claim 1, wherein the padding circuit adds a second padding value to the rear end of the line data, and wherein the rendering circuit applies the rendering filter of one-dimension to a current data value and a subsequent data value in the line data.

7. The display device according to claim 1, wherein the sub-pixels include a first color sub-pixel, a second color sub-pixel, and a third color sub-pixel, wherein the first frame data includes first color data for the first color sub-pixel, second color data for the second color sub-pixel, and third color data for the third color sub-pixel, wherein the padding circuit adds the first padding value to each of the first color data and the third color data, and wherein the rendering circuit applies a first rendering filter to each of the first color data and the third color data.

8. The display device according to claim 7, wherein the padding circuit and the rendering circuit bypass the second color data.

9. The display device according to claim 8, wherein the driver further comprises a dimming circuit configured to dim values corresponding to an edge of the display panel among values of the second color data.

10. The display device according to claim 1, wherein the padding circuit adds padding line data to at least one of a front end and a rear end of the first frame data.

11. The display device according to claim 10, wherein the padding circuit adds first padding line data to the front end of the first frame data, and wherein the rendering circuit applies the rendering filter to a current data value in the line data and a data value in previous line data adjacent to the current data value.

12. The display device according to claim 10, wherein the padding circuit calculates the padding line data by applying a first offset value to at least one of first line data and last line data in the first frame data, and calculates a second padding value for another line data by applying a second offset value to the other line data in the first frame data, and wherein the second offset value is different from the first offset value.

13. The display device according to claim 1, wherein the sub-pixels include a first color sub-pixel, a second color sub-pixel, and a third color sub-pixel, wherein the first frame data includes first color data for the first color sub-pixel, second color data for the second color sub-pixel, and third color data for the third color sub-pixel, wherein the padding circuit adds first padding line data to a front end of each of the first color data and the third color data, and wherein the rendering circuit applies a rendering filter to each of the first color data and the third color data.

14. The display device according to claim 13, wherein the padding circuit adds second padding line data to a rear end of the second color data, and wherein the rendering circuit applies the rendering filter to the second color data.

15. The display device according to claim 1, wherein when the first frame data is a full-white image, a luminance of outermost sub-pixels which are most adjacent to an edge of the display panel is different from a luminance of remaining sub-pixels except for the outermost sub-pixels among the sub-pixels.

16. A display device comprising:

a display panel including sub-pixels; and a driver configured to convert first frame data corresponding to a first pixel arrangement of the sub-pixels into second frame data corresponding to a second pixel arrangement, and provide data signals corresponding to the second frame data to the sub-pixels having the second pixel arrangement, wherein the driver comprises:

a padding circuit configured to convert the first frame data into padding data by padding line data on at least one of a front end and a rear end of the first frame data; and a rendering circuit configured to generate the second frame data by applying a rendering filter to the padding data.

17. The display device according to claim 16, wherein the padding circuit adds first padding line data to the front end of the first frame data, and wherein the rendering circuit applies the rendering filter to a current data value in the line data and a data value in previous line data adjacent to the current data value.

18. The display device according to claim 16, wherein the padding circuit:

calculates a first value of the line data to be padded by applying a first offset value to at least one of first line data and last line data in the first frame data, and calculates at least one remaining value except for the first value of the line data to be padded by applying a second offset value to the at least one of the first line data and the last line data in the first frame data, and wherein the second offset value is different from the first offset value.

19. The display device according to claim 16, wherein the sub-pixels include a first color sub-pixel, a second color sub-pixel, and a third color sub-pixel, wherein the first frame data includes first color data for the first color sub-pixel, second color data for the second color sub-pixel, and third color data for the third color sub-pixel, wherein the padding circuit adds first padding line data to a front end of each of the first color data and the third color data, and wherein the rendering circuit applies the rendering filter to each of the first color data and the third color data.

20. The display device according to claim 19, wherein the padding circuit adds second padding line data to a rear end of the second color data, and wherein the rendering circuit applies the rendering filter to the second color data.

* * * * *